United States Patent
Wang

(10) Patent No.: US 12,341,693 B2
(45) Date of Patent: Jun. 24, 2025

(54) DATA TRANSMISSION CONTROL METHOD, APPARATUS, AND STORAGE MEDIUM

(71) Applicant: Shenzhen Yinwang Intelligent Technologies Co., Ltd., Shenzhen (CN)

(72) Inventor: Zhe Wang, Dongguan (CN)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 472 days.

(21) Appl. No.: 17/686,581

(22) Filed: Mar. 4, 2022

(65) Prior Publication Data

US 2022/0191140 A1    Jun. 16, 2022

Related U.S. Application Data

(63) Continuation of application No. PCT/CN2020/098288, filed on Jun. 24, 2020.

(30) Foreign Application Priority Data

Sep. 5, 2019    (CN) .......................... 201910838564.5

(51) Int. Cl.
*H04L 45/74*    (2022.01)
*H04L 47/2425*    (2022.01)
*H04L 47/25*    (2022.01)

(52) U.S. Cl.
CPC .......... *H04L 45/74* (2013.01); *H04L 47/2433* (2013.01); *H04L 47/25* (2013.01); *H04L 2212/00* (2013.01)

(58) Field of Classification Search
CPC ......... H04L 45/74; H04L 47/24; H04L 47/25; H04L 47/26; H04L 47/21; H04L 47/12;
(Continued)

(56) References Cited

U.S. PATENT DOCUMENTS 8,705,349 B2 * 4/2014 Bloch ................... H04L 47/263
                                                    370/231
9,544,239 B2 * 1/2017 Gafni ...................... H04L 47/32
(Continued)

FOREIGN PATENT DOCUMENTS

CN    102611620 A    7/2012
CN    106537856 A    3/2017
(Continued)

OTHER PUBLICATIONS

Mash, "In-vehicle Ethernet Brings Fundamental Change to Automotive Networks", DOI:CNKI:SUN: QCPJ.0.2018-08-034, 2018, 3 pages (including English abstract).
(Continued)

*Primary Examiner* — Man U Phan
(74) *Attorney, Agent, or Firm* — Leydig, Voit & Mayer, Ltd.

(57) ABSTRACT

A first node determines, based on a data flow identifier of a data flow and a packet header, a first data packet corresponding to an egress port same as the data flow from the to-be-transmitted data packet; obtains, based on the meta information, a meta information value corresponding to the first data packet; and when determining that the feedback trigger condition is met, sends a second data packet to a second node, where the second data packet is used to enable the second node to reduce a transmission rate of at least one data flow in data flows corresponding to the first data packet, or sends, to a third node, indication information used to reduce a transmission rate of at least one data flow in data flows corresponding to the first data packet.

14 Claims, 10 Drawing Sheets

(58) Field of Classification Search
CPC ......... H04L 47/18; H04L 47/19; H04L 47/32;
H04L 47/36; H04L 47/10; H04L 47/28;
H04L 47/34; H04L 47/31; H04L 47/62;
H04L 12/08; H04L 12/28; H04L 12/72;
H04L 12/74; H04L 12/80; H04L 12/82;
H04L 12/85; H04L 45/00; H04L 45/38;
H04L 45/66; H04L 45/75
USPC ......................................................... 370/392
See application file for complete search history.

(56) References Cited

U.S. PATENT DOCUMENTS

| | | | | |
|---|---|---|---|---|
| 10,003,544 | B2* | 6/2018 | Liu | H04L 47/26 |
| 10,505,851 | B1* | 12/2019 | Matthews | H04L 47/30 |
| 10,581,962 | B2* | 3/2020 | Cheng | H04L 61/2571 |
| 10,833,998 | B2* | 11/2020 | Shmilovici | H04L 45/74 |
| 10,855,606 | B2* | 12/2020 | Shiraki | H04L 47/6255 |
| 11,496,401 | B2* | 11/2022 | Shmilovici | H04L 45/74 |
| 11,882,041 | B2* | 1/2024 | Shmilovici | H04L 47/2483 |
| 12,028,256 | B2* | 7/2024 | Li | H04L 47/32 |
| 2008/0298248 | A1 | 12/2008 | Roeck et al. | |
| 2011/0273983 | A1 | 11/2011 | Bergamasco et al. | |
| 2016/0043840 | A1 | 2/2016 | Lee et al. | |
| 2016/0173330 | A1 | 6/2016 | Yun et al. | |
| 2017/0339075 | A1* | 11/2017 | Arad | H04L 49/9084 |
| 2018/0198715 | A1 | 7/2018 | Shmilovici et al. | |
| 2019/0116122 | A1 | 4/2019 | Friedman et al. | |
| 2019/0116126 | A1 | 4/2019 | Shen et al. | |
| 2020/0145340 | A1* | 5/2020 | Mula | H04L 47/12 |
| 2022/0078119 | A1* | 3/2022 | Goyal | H04L 47/25 |

FOREIGN PATENT DOCUMENTS

| | | |
|---|---|---|
| CN | 106664255 A | 5/2017 |
| CN | 108418723 A | 8/2018 |
| CN | 108418767 A | 8/2018 |
| CN | 108667739 A | 10/2018 |
| CN | 109691039 A | 4/2019 |
| CN | 109861999 A | 6/2019 |
| CN | 109981471 A | 7/2019 |
| CN | 109995664 A | 7/2019 |
| CN | 110647071 A | 1/2020 |
| CN | 106134138 B | 2/2020 |
| JP | S6324742 A | 2/1988 |
| JP | 2003244223 A | 8/2003 |
| KR | 101673304 B1 | 11/2016 |

OTHER PUBLICATIONS

Imtiaz et al., "A Performance Study of Ethernet Audio Video Bridging (AVB) for Industrial Real-time Communication", 2009 IEEE, 8 pages.

Lei et al., "Analysis of Delay in High-speed Electric Multiple Units Vehicle-Mounted Ethernet", Computer Measurement and Control, 2013, vol. 21, No. 5, 3 pages (including English abstract).

Queck, "Analysis of Ethernet AVB for Automotive Networks using Network Calculus", 2012 IEEE International Conference on Vehicular Electronics and Safety, Jul. 24-27, 2012, 7 pages.

* cited by examiner

| Node identifier (Node id) | Ingress port identifier (Iport id) | Egress port identifier (Eport id) | Queue identifier (Queue id) | Queue depth (Queue depth) | Utilization of egress bandwidth (Tx bandwidth) | Forwarding latency (Forwarding latency) | Maximum latency (Flow max latency) | Oct 1 |
|---|---|---|---|---|---|---|---|---|
| Queue occupancy depth of a flow (Flow depth) | Flow identifier (Flow id) | Data flow type (Flow info type) | User-defined information (user-defined info) | | | | | Oct 2 |

| | Oct 1 | Oct 2 |
|---|---|---|
| | 1 | 1 |
| | 1 | 1 |
| | 1 | 1 |
| | 1 | 0 |
| | 1 | |
| | 1 | |
| | 1 | |
| | 1 | |

DATA TRANSMISSION CONTROL METHOD, APPARATUS, AND STORAGE MEDIUM

CROSS-REFERENCE TO RELATED APPLICATIONS

This application is a continuation of International Application No. PCT/CN2020/098288, filed on Jun. 24, 2020, which claims priority to Chinese Patent Application No. 201910838564.5, filed on Sep. 5, 2019. The disclosures of the aforementioned applications are hereby incorporated by reference in their entireties.

FIELD

The embodiments relate to the field of data transmission technologies, and in particular, to a data transmission control method, an apparatus, and a storage medium.

BACKGROUND

With rapid development of automotive electronics, there are increasingly more vehicle-mounted sensors in the automotive Ethernet, and there is increasingly more collected data. Currently, a large amount of data may be processed in an advanced driver assistant system (ADAS), but an electronic control unit (ECU) in the ADAS has a high requirement on real-time data processing. Therefore, how to ensure a low latency requirement of the automotive Ethernet becomes a focus.

In the conventional technology, an audio video bridge (AVB) traffic scheduling mechanism or a time sensitive network (TSN) traffic scheduling mechanism is usually used to ensure a low latency requirement of the automotive Ethernet. The AVB traffic scheduling mechanism is based on the 802.1Qav protocol. A switch chip may allocate a higher priority to an AVB frame (AVB data packet), allocates a common priority to a common frame, and uses a credited based shaper (CBS) scheduling algorithm to separately schedule the two types of data packets. A latency of the AVB frame is reduced through separate scheduling when traffic bursts. The TSN traffic scheduling mechanism is based on the 802.1Qbv protocol. A switch chip may control sending of a data packet by defining a switching status for each queue in each time slice. A proper time sequence is arranged for a high-priority data packet and frame preemption scheduling is performed, so that the high-priority data packet is preferentially scheduled.

However, the AVB traffic scheduling mechanism is a scheduling mechanism based on priority of a data packet, and the data packet may have been congested. If congestion cannot be prevented in advance, a forwarding latency of the data packet may be high. In the TSN traffic scheduling mechanism, frame preemption occurs, indicating that congestion may have occurred, and a forwarding latency of a data packet has been increased. Therefore, when a node in the current automotive Ethernet forwards a data packet, a high latency may still exist.

SUMMARY

The embodiments provide a data transmission control method, an apparatus, and a storage medium, to reduce a forwarding latency of a data packet.

According to a first aspect, a data transmission control method may include: a first node obtains a feedback trigger condition, meta information, and a data flow identifier of a data flow; obtains a packet header of a to-be-transmitted data packet; determines, based on the data flow identifier and the obtained packet header, first data packets corresponding to an egress port same as the data flow from the to-be-transmitted data packet; obtains, based on the meta information, a meta information value corresponding to the first data packet; and when determining that the feedback trigger condition is met, encapsulates the meta information value corresponding to the first data packet and a packet header of the first data packet into a second data packet, and sends the second data packet to a second node, where the second data packet is used to enable the second node to reduce a transmission rate of at least one data flow in data flows corresponding to the first data packet, or sends indication information to a third node, where the indication information is used to indicate the third node to reduce a transmission rate of at least one data flow in data flows corresponding to the first data packet.

Based on this solution, the first node may encapsulate, based on a requirement, meta information values and a packet header corresponding to the first data packet corresponding to the egress port same as the data flow into a second data packet, and send the second data packet to the second node. The second node determines, based on the second data packet, whether there is a data flow on which rate reduction processing needs to be performed, and if there is the data flow on which rate reduction processing needs to be performed, the second node notifies a source end (for example, the first node or the third node) to perform rate reduction processing on the data flow on which rate reduction processing needs to be performed. In this way, congestion can be prevented in advance, to help reduce a forwarding latency of a data packet, and further help reduce a packet loss rate of an egress port. Especially in a traffic burst scenario in which a plurality of ingress ports corresponds to a single egress port, it can be ensured that high-priority data packets are forwarded in a timely manner.

In a possible implementation, the first node may encapsulate a meta information value corresponding to one first data packet and a packet header of the first data packet into one second data packet. In another possible implementation, the first node may encapsulate meta information values and a packet header that are respectively corresponding to a plurality of first data packets into one second data packet.

The first node may add the meta information value corresponding to the first data packet before the packet header of the first data packet; and adds a new packet header before the meta information value corresponding to the first data packet, to obtain the second data packet, where a destination address in the new packet header is an address of the second node. A format of the second data packet may be: the new packet header+the meta information value corresponding to the first data packet+the packet header of the first data packet. In this way, the first node may determine, by using the new packet header, that the second data packet needs to be sent to the second node, may determine, based on the meta information value, whether rate reduction processing needs to be performed, and further, may determine, based on the packet header of the first data packet, a data flow to which the first data packet corresponds, that is, determine a data flow on which rate reduction processing needs to be performed.

The first node may modify a priority of the second data packet to be greater than a priority threshold, to enable the second data packet to be forwarded to the second node in a timely manner, so that the second node determines, in a timely manner, whether congestion may occur. For example, the first node may modify the priority of the second data packet to 7.

The meta information may include at least one of a node identifier, an ingress port identifier, an egress port identifier, a queue identifier, a forwarding latency of a data packet, a maximum tolerable latency of a single packet, a data flow identifier corresponding to the data packet, and a data type corresponding to the data packet, and the data type includes control plane data, management plane data, and data plane data.

Further, optionally, the meta information may further include a queue depth, utilization of egress bandwidth for a queue, a queue occupancy depth of a flow, user-defined information, and the like.

In a possible implementation, the feedback trigger condition includes any one or more of the following: a forwarding latency of the first data packet is greater than the maximum tolerable latency of the single packet; a quantity of received first data packets is greater than a preset quantity; one first data packet is received each time; a queue depth is greater than a preset queue depth; and utilization of egress bandwidth for a queue is greater than preset bandwidth utilization, where the queue depth is a ratio of a buffer occupied by all data packets in the queue to a total buffer for the queue.

In a possible implementation, the first node may determine, based on any one of the following three implementations, whether the feedback trigger condition is met.

Implementation 1: The first node may determine, based on the meta information value corresponding to the first data packet, whether the feedback trigger condition is met. For example, when determining that the forwarding latency in the meta information value corresponding to the first data packet is greater than the maximum tolerable latency of the single packet, the first node determines that the feedback trigger condition is met. For another example, when determining that the queue depth in the meta information value corresponding to the first data packet is greater than the preset queue depth, the first node determines that the feedback trigger condition is met. For another example, when determining that the utilization that is of the egress bandwidth for the queue and that is in the meta information value corresponding to the first data packet is greater than the preset bandwidth utilization, the first node determines that the feedback trigger condition is met.

Implementation 2: The first node may determine, based on statistical information about first data packets, whether the feedback trigger condition is met. For example, the first node may collect statistics about a quantity of first data packets received within preset duration, and when the quantity is greater than the preset quantity, determine that the feedback trigger condition is met.

Implementation 3: Each time a first data packet is received, the first node determines that the feedback trigger condition is met.

In a possible implementation, the to-be-transmitted data packet may be from the third node and/or the second node.

In a possible implementation, the first node may receive meta information, the data flow identifier, and the feedback trigger condition that are configured by the second node.

In another possible implementation, the first node may determine the meta information, the data flow identifier, and the feedback trigger condition based on a system default setting.

In still another possible implementation, the first node may determine the meta information based on a system default setting and receive the data flow identifier and the feedback trigger condition that are configured by the second node. Alternatively, the first node may determine the feedback trigger condition based on a system default setting and receive the data flow identifier and the meta information that are configured by the second node. Alternatively, the first node may determine the data flow identifier based on a system default setting and receive the feedback trigger condition and the meta information that are configured by the second node. Alternatively, the first node may determine the meta information and the feedback trigger condition based on a system default setting and receive the data flow identifier configured by the second node. Alternatively, the first node may determine the data flow identifier and the feedback trigger condition based on a system default setting, and receive the meta information configured by the second node. Alternatively, the first node may determine the data flow identifier and the meta information based on a system default setting and receive the feedback trigger condition configured by the second node.

According to a second aspect, a data transmission control method may include: a second node receives M second data packets from a first node; determines a target data flow based on the M second data packets and a rate reduction condition; and reduces a transmission rate of the target data flow in a rate reduction manner, or sends indication information to a third node, where the indication information is used to indicate the third node to reduce the transmission rate of the target data flow in the rate reduction manner. The target data flow is at least one of the one or more data flows corresponding to the M second data packets. The second data packet is sent by the first node to the second node when the first node determines that a feedback trigger condition is met, the second data packet carries a packet header of a first data packet and a meta information value corresponding to the first data packet, and the first data packet is determined by the first node from a to-be-transmitted data packet based on a data flow identifier of a data flow. M is an integer greater than or equal to 1.

Based on this solution, the second node may receive the second data packet sent by the first node based on a requirement. Because the second data packet carries the packet header of the first data packet and the meta information value corresponding to the first data packet, the second node may determine, based on the packet header of the first data packet and the meta information value corresponding to the first data packet that are carried in the second data packet, whether there is a data flow on which rate reduction processing needs to be performed, and if there is the data flow on which rate reduction processing needs to be performed, the second node notifies a source end (for example, the first node or the third node) to perform rate reduction processing on the data flow on which rate reduction processing needs to be performed. In this way, congestion can be prevented in advance, to help reduce a forwarding latency of a data packet, and further help reduce a packet loss rate of an egress port. Especially in a traffic burst scenario in which a plurality of ingress ports correspond to a single egress port, it can be ensured that high-priority data packets are forwarded in a timely manner.

In a possible implementation, the second node may send, to the first node, the feedback trigger condition, meta information, and the data flow identifier that are configured.

The meta information may include at least one of a node identifier, an ingress port identifier, an egress port identifier, a queue identifier, a forwarding latency of a data packet, a maximum tolerable latency of a single packet, a data flow identifier corresponding to the data packet, and a data type corresponding to the data packet, and the data type includes control plane data, management plane data, and data plane data.

In a possible implementation, a priority relationship between the control plane data, the management plane data, and the data plane data is a sequence in which corresponding data flows are determined as target data flows, that is, the control plane data>the management plane data>the data plane data. In this way, a transmission rate of a data flow on a data plane is preferentially reduced, so that it can be determined that important data on a control plane can be forwarded in a timely manner, to help ensure that key control plane information of an ADAS is processed in a timely manner.

Further, optionally, the meta information may further include a queue depth and a queue occupancy depth that is of a data flow and that corresponds to the first data packet.

In a possible implementation, the rate reduction condition may include any one of a first condition, a second condition, and a third condition. The first condition is that in a sampling period, an average value of forwarding latencies in meta information values respectively corresponding to k first data packets belonging to a same data flow is greater than a first preset value, where k is an integer less than or equal to M. The second condition is that in the sampling period, an average value of queue occupancy depths that are of data flows and that are in the meta information values respectively corresponding to the k first data packets belonging to the same data flow is greater than a second preset value. The third condition is that in the sampling period, an average value of queue depths in the meta information values respectively corresponding to the k first data packets belonging to the same data flow is greater than a third preset value.

In a possible implementation, the first node may determine, based on the packet header that is of the first data packet and that is carried in the second data packet, which second data packets in the M second data packets correspond to a same data flow. Based on the determined correspondence between the M second data packets and the data flow, an implementation process of determining the target data flow may be described in detail in the following two cases.

Case 1: The M second data packets correspond to one data flow

Based on Case 1, if the second node determines that an average value of forwarding latencies in meta information values that correspond to first data packets and that are respectively carried in k second data packets in the M second data packets is greater than the first preset value, the second node determines the data flow corresponding to the M second data packets as the target data flow; if the second node determines that an average value of queue occupancy depths that are of data flows and that are in meta information values that correspond to first data packets and that are respectively carried in k second data packets in the M second data packets is greater than the second preset value, the second node determines the data flow corresponding to the M second data packets as the target data flow; or if the second node determines that an average value of queue depths in meta information values that correspond to first data packets and that are respectively carried in k second data packets in the M second data packets is greater than the third preset value, the second node determines the data flow corresponding to the M second data packets as the target data flow.

Case 2: The M second data packets correspond to a plurality of data flows, and k is an integer less than M.

In Case 2, each data flow includes at least k second data packets.

Based on Case 2, the second node determines an average value of forwarding latencies in meta information values that correspond to first data packets and that are respectively carried in the k second data packets in each data flow and determines a data flow in which the average value of the forwarding latencies is greater than the first preset value and whose priority is the lowest as the target data flow. Alternatively, the second node determines an average value of queue occupancy depths that are of data flows and that are in meta information values that correspond to first data packets and that are respectively carried in the k second data packets in each data flow, and determines a data flow in which the average value of the queue occupancy depths of the data flows is greater than the second preset value and whose priority is the lowest as the target data flow. Alternatively, the second node determines an average value of queue depths in meta information values that correspond to first data packets and that are respectively carried in the k second data packets in each data flow and determines a data flow in which the average value of the queue depths is greater than the third preset value and whose priority is the lowest as the target data flow.

In a possible implementation, the rate reduction manner includes: if the target data flow is determined based on the first condition, reducing the transmission rate of the target data flow by a first percentage; or if the target data flow is determined based on the second condition, reducing the transmission rate of the target data flow by a second percentage; or if the target data flow is determined based on the third condition, reducing the transmission rate of the target data flow by a third percentage.

According to a third aspect, an embodiment may provide an apparatus including a processor and a communications interface. Optionally, the apparatus may further include a memory. When the apparatus includes the memory, the memory is configured to store instructions. The processor is configured to execute the instructions stored in the memory. When the processor executes the instructions stored in the memory, the apparatus is configured to perform the method according to any one of the first aspect or the possible implementations of the first aspect or is configured to perform the method according to any one of the second aspect or the possible implementations of the second aspect.

According to a fourth aspect, an embodiment may provide an apparatus, configured to implement the method according to any one of the first aspect or the possible implementations of the first aspect, or configured to implement the method according to any one of the second aspect or the possible implementations of the second aspect. The apparatus includes corresponding functional modules respectively configured to implement steps in the foregoing methods. The functions may be implemented by hardware or may be implemented by hardware executing corresponding software. The hardware or the software includes one or more modules corresponding to the functions.

In a possible implementation, a structure of the apparatus includes a processing unit and a transceiver unit. Optionally, the apparatus further includes a storage unit. These units may perform corresponding functions in the foregoing method examples. For details, refer to detailed descriptions in the method examples. The details are not described herein again.

According to a fifth aspect, a system may include a first node and a second node. The first node may be configured to perform the method according to any one of the first aspect or the possible implementations of the first aspect, and the second node may be configured to perform the method according to any one of the second aspect or the possible implementations of the second aspect.

According to a sixth aspect, an embodiment may provide a computer storage medium that stores instructions. When the instructions are run on a computer, the computer is enabled to perform the method according to any one of the first aspect or the possible implementations of the first aspect, or the computer is enabled to perform the method according to any one of the second aspect or the possible implementations of the second aspect.

According to a seventh aspect, an embodiment may provide a computer program product including instructions. When the computer program product runs on a computer, the computer is enabled to perform the method according to any one of the first aspect or the possible implementations of the first aspect, or the computer is enabled to perform the method according to any one of the second aspect or the possible implementations of the second aspect.

BRIEF DESCRIPTION OF DRAWINGS

FIG. 3a is a schematic diagram of a structure of meta information in a bitmap form;

FIG. 3b is a schematic diagram of another structure of meta information in a bitmap form;

DETAILED DESCRIPTION OF THE EMBODIMENTS

To make the objectives, solutions, and advantages clearer, the following further describes detail with reference to the accompanying drawings.

It should be understood that "at least one" means one or more, and "a plurality of" means two or more. The term "and/or" is used to describe an association relationship between associated objects and indicates that three relationships may exist. For example, "A and/or B" may indicate the following three cases: only A exists, only B exists, and both A and B exist, where A and B may be singular or plural. The character "/" generally indicates an "or" relationship between the associated objects. "At least one of the following items (pieces)" or a similar expression thereof indicates any combination of these items, including a single item (piece) or any combination of plural items (pieces). For example, at least one of a, b, or c may indicate a, b, c, "a and b", "a and c", "b and c", or "a, b, and c", where a, b, and c may be singular or plural. The terms "first", "second", and the like are intended to distinguish between similar objects but do not necessarily indicate a specific order or sequence. In addition, the terms "include", "have", and any variant thereof are intended to cover a non-exclusive inclusion, for example, a series of modules or units. A system, product, or device is not necessarily limited to those modules or units that are clearly listed but may include other modules or units that are not clearly listed or inherent to these systems, modules, or units.

There may be three applicable automotive Ethernet scenarios.

Scenario 1: An automotive Ethernet system is a single mobile data center (MDC) system.

Figure 1A:
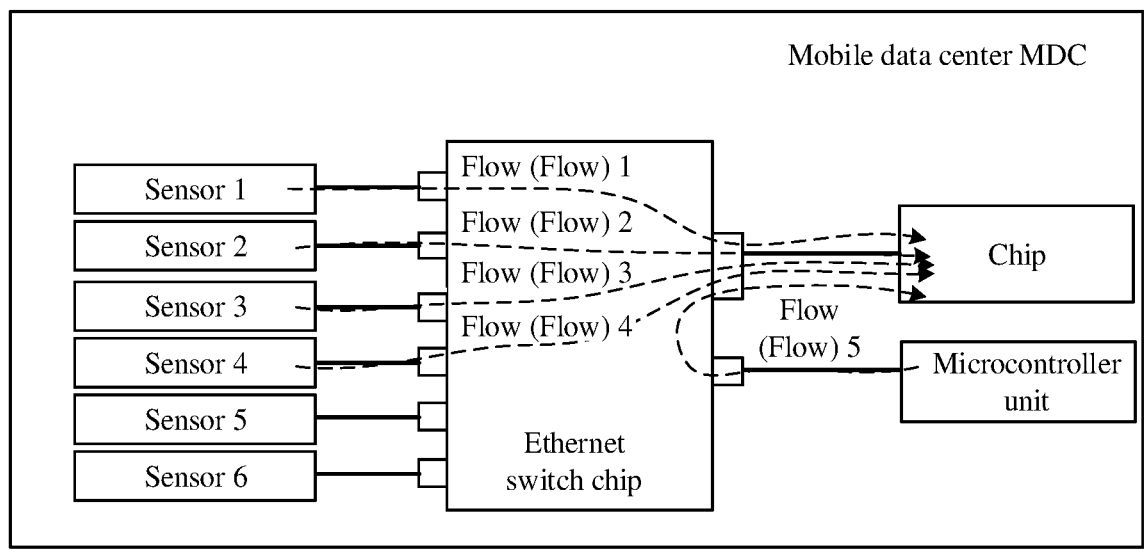
FIG. 1a is a schematic diagram of an architecture of an MDC system.

FIG. 1a is a schematic diagram of an architecture of an MDC system. The MDC system may include a sensor, an Ethernet switch, a local area network switch (LSW) chip, a chip, and a microcontroller unit (MCU). For example, FIG. 1a includes a sensor 1 to a sensor 6, an LSW, a chip, and an MCU. Each sensor may be connected to the LSW through one port in the LSW, the chip may be connected to the LSW through one port in the LSW, and the MCU may also be connected to the LSW through one port in the LSW.

Sensors (for example, the sensor 1 to the sensor 6 shown in FIG. 1a) may be, for example, various sensors externally connected to an ADAS, laser radars, light detection and ranging (LiDAR), or cameras. The sensors may send or receive data flows, and each sensor may send or receive any quantity of data flows. In FIG. 1a, for ease of description of the solution, descriptions are provided by using an example in which the sensor sends one data flow.

The LSW may support a plurality of gigabit Ethernet (GE) ports or ten-gigabit Ethernet (XGE) ports. The sensor, the MCU, the LSW, and the chip may be connected to each other through the GE ports or the XGE ports. The LSW is configured to: exchange and forward data. Further, optionally, based on a flow direction of a data flow, a port through which a data flow flows into the LSW may be referred to as an ingress port, and a port through which a data flow flows out of the LSW may be referred to as an egress port. As shown in FIG. 1a, ports connected to the sensor and the MCU may be referred to as ingress ports, that is, data flows of the sensor and the MCU flow into the LSW. A port that is in the LSW and that is connected to the chip may be referred to as an egress port, that is, a data flow of the LSW flows into the chip. In Scenario 1, a plurality of ingress ports may correspond to a same egress port. In other words, a large quantity of data flows may pass through the same egress port.

The chip, for example, an artificial intelligence (AI) chip, is also referred to as an AI accelerator or computing card. The AI chip may be configured to tackle a large quantity of computing tasks, for example, obtain information carried in a data packet, and perform a related operation based on the information in the data packet. The AI chip includes, for example, a graphics processing unit (GPU), a digital signal processing (DSP) circuit, a field programmable gate array (FPGA), an application-specific integrated circuit (ASIC), or another programmable logic device.

The MCU, also referred to as a single chip microcomputer or a single-chip microcomputer, integrates peripheral interfaces such as memory and a timer on a single chip, to form a chip-level computer. The MCU may send or receive any quantity of data flows. In FIG. 1a, for ease of description of the solution, descriptions are provided by using an example in which the MCU sends one data flow.

Scenario 2: An automotive Ethernet system is an MDC-AB system.

Figure 1B:
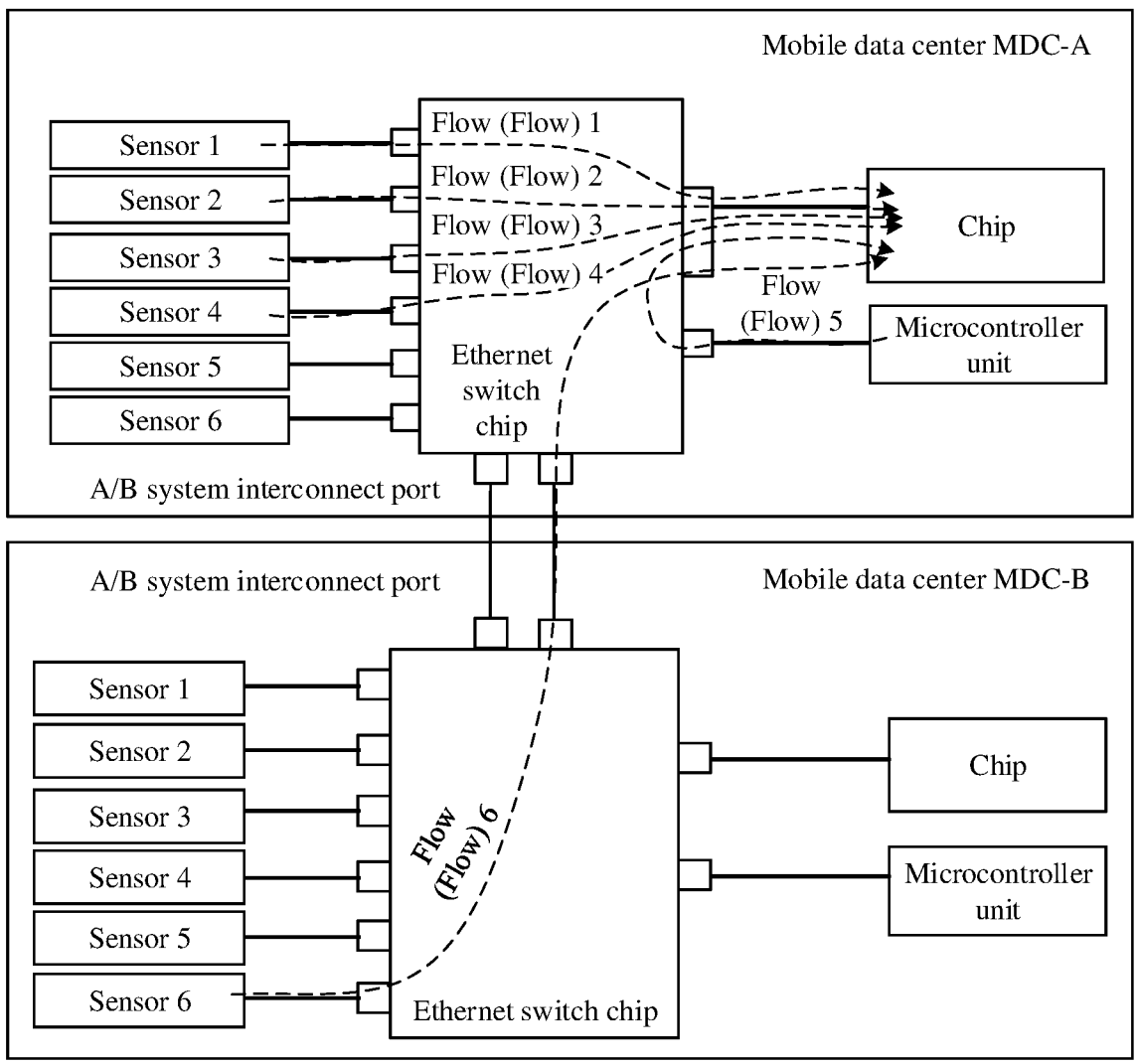
FIG. 1b is a schematic diagram of an architecture of an MDC-AB system.

It may also be understood that the MDC-AB system is a system including two single MDC systems. FIG. 1b is a schematic diagram of an architecture of an MDC-AB system. The MDC-AB system may include an MDC-A system and an MDC-B system, and the MDC-A system and the MDC-B system may be connected through A/B system interconnect ports. Structures included in the MDC-A system and the MDC-B system may be the same or different. In FIG. 1b, for example, the MDC-A system and the MDC-B system are the same. For both the MDC-A system and the MDC-B system, refer to the descriptions in FIG. 1a. Details are not described herein again.

In Scenario 2, the MDC-A system may send a data flow to the MDC-B system through an A/B system interconnect port or may receive a data flow from the MDC-B system through an A/B system interconnect port. If the MDC-A system sends the data flow to the MDC-B system through the A/B system interconnect port, the MDC-A system is used as a source end of the MDC-B system. If the MDC-A system receives the data flow from the MDC-B system, the MDC-B system is used as a source end of the MDC-A system.

Scenario 3: An automotive Ethernet system is an MDC-ABC system.

Figure 1C:
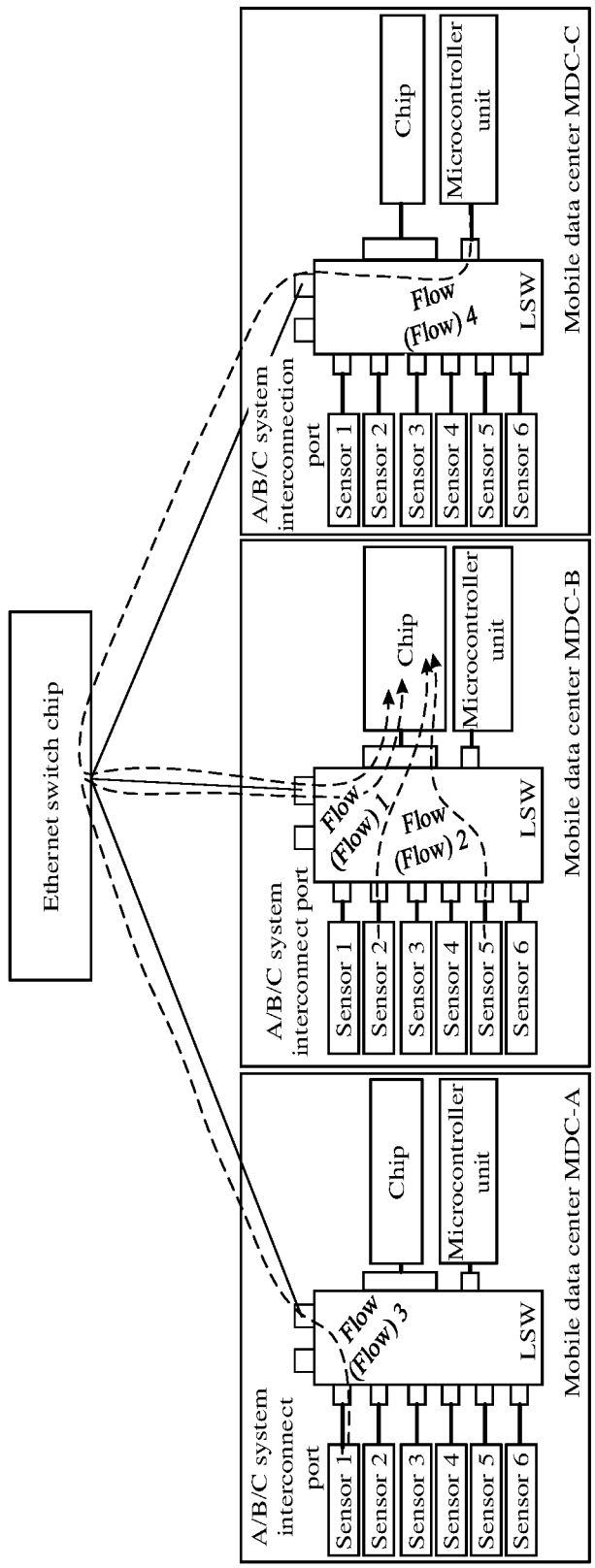
FIG. 1c is a schematic diagram of an architecture of an MDC-ABC system.

It may also be understood that the MDC-ABC system is a system including three single MDC systems. FIG. 1c is a schematic diagram of an architecture of an MDC-ABC system. The MDC-ABC system may include an MDC-A system, an MDC-B system, and an MDC-C system. The MDC-A system, the MDC-B system, and the MDC-C system may be connected to an external Ethernet switch chip (for example, an automotive Ethernet switch chip) through A/B/C system interconnect ports in the systems, to implement a connection between the MDC-A system, the MDC-B system, and the MDC-C system. The external Ethernet switch chip may provide a plurality of ports. For the MDC-A system, the MDC-B system, and the MDC-C system, refer to the descriptions in FIG. 1a. Details are not described herein again.

In Scenario 3, both the MDC-A system and the MDC-C system may send data flows to the MDC-B system through respective A/B/C system interconnect ports and the external Ethernet switch chip or may receive data flows from the MDC-B system through A/B/C system interconnect ports and the external Ethernet switch chip. If both the MDC-A system and the MDC-C system send the data flows to the MDC-B system through the A/B/C system interconnect ports and the external Ethernet switch chip, both the MDC-A system and the MDC-C system are used as source ends of the MDC-B system.

It should be noted that, in the foregoing three scenarios, the data flow flows into the chip through the egress port. The egress port may alternatively be a port through which the data flow of the LSW flows into another device, and the egress port is not limited to the port through which the data flow flows into the chip. In addition, the chip may also transmit a data flow to the LSW, that is, the chip may also be used as a source end.

It should be understood that the foregoing descriptions are merely examples. The method provided may be further applied to a plurality of scenarios but is not limited to the foregoing three scenarios.

Based on the foregoing content, buffer space used to store a data flow in the LSW is small and is usually 1 Mbit. If the data flow stored in the LSW cannot be scheduled in a timely manner, congestion is likely to occur. In addition, a latency of forwarding a data packet by the LSW may increase sharply due to the congestion, and even a packet loss may occur in a direction of the egress port in the LSW. In particular, in a multi-MDC interconnection expansion scenario (for example, Scenario 2 and Scenario 3), a large amount of burst traffic is likely to occur, that is, a plurality of data flows may flow into the LSW from a plurality of ports and flow out of one port. In the multi-MDC interconnection expansion scenario, when a large quantity of data flows burst, congestion is more likely to occur.

In view of the foregoing problem, a data transmission control method may prevent congestion of a data flow in advance, so that a data packet is forwarded in a timely manner, to help reduce a forwarding latency of the data packet.

The following describes, in detail with reference to FIG. 2 to FIG. 5A and FIG. 5B, a data transmission control method.

Figure 2:
FIG. 2 is a schematic flowchart of a data transmission control method.

FIG. 2 shows an example of a schematic flowchart of a data transmission control method. In the following description process, the method may be applied to Scenario 1, Scenario 2, or Scenario 3. The method may be performed by three types of nodes. The three types of nodes are, for example, a first node, a second node, and a third node. When the method is applied to Scenario 1, the first node may be an LSW, the second node may be a chip, and the third node may be a sensor and an MCU. When the method is applied to Scenario 2, the method may be performed in each of an MDC-A system and an MDC-B system. In the MDC-A system, the first node may be an LSW in the MDC-A system, the second node may be a chip in the MDC-A system, and the third node may be a sensor and an MCU in the MDC-A system and the MDC-B system. In the MDC-B system, the first node may be an LSW in the MDC-B system, the second node may be a chip in the MDC-B system, and the third node may be a sensor and an MCU in the MDC-B system. When the method is applied to Scenario 3, the method may be performed in each of an MDC-A system, an MDC-B system, and an MDC-C system. In the MDC-A system, the first node may be an LSW in the MDC-A system, the second node may be a chip in the MDC-A system, and the third node may be a sensor and an MCU in the MDC-A system, the MDC-B system, and the MDC-C system. In the MDC-B system, the first node may be an LSW in the MDC-B system, the second node may be a chip in the MDC-B system, and the third node may be a sensor and an MCU in the MDC-B system, the MDC-A system, and the MDC-C system. In the MDC-C system, the first node may be an LSW in the MDC-C system, the second node may be a chip in the MDC-C system, and the third node may be a sensor and an MCU in the MDC-C system, the MDC-B system, and the MDC-A system. As shown in FIG. 2, the method includes the following steps.

Step 201: The first node determines meta information, a data flow identifier of a data flow, and a feedback trigger condition.

In a possible implementation, the second node may send, to the first node, the meta information, the data flow identifier, and the feedback trigger condition that are configured. Correspondingly, the first node receives the meta information, the data flow identifier, and the feedback trigger condition that are configured by the second node.

In another possible implementation, the first node may determine the meta information, the data flow identifier, and the feedback trigger condition based on a system default setting.

In still another possible implementation, the first node may determine the meta information based on a system default setting and receive the data flow identifier and the feedback trigger condition that are configured by the second node. Alternatively, the first node may determine the feedback trigger condition based on a system default setting and receive the data flow identifier and the meta information that are configured by the second node. Alternatively, the first node may determine the data flow identifier based on a system default setting and receive the feedback trigger condition and the meta information that are configured by the second node. Alternatively, the first node may determine the meta information and the feedback trigger condition based on a system default setting and receive the data flow identifier configured by the second node. Alternatively, the first node may determine the data flow identifier and the feedback trigger condition based on a system default setting, and receive the meta information configured by the second node. Alternatively, the first node may determine the data flow identifier and the meta information based on a system default setting and receive the feedback trigger condition configured by the second node.

The following separately describes in detail the meta information, the data flow identifier, and the feedback trigger condition.

The meta information may include at least one of a node identifier (node id), an ingress port identifier (iport id), an egress port identifier (eport id), a queue identifier (queue id), a forwarding latency of a data packet, a maximum tolerable latency (flow max latency) of a single packet, a data flow identifier (flow id) corresponding to the data packet, and a data type (flow info type) corresponding to the data packet, and the data type includes control plane data, management plane data, and data plane data. The node identifier is an identifier of the first node that transmits (or forwards) a data packet, for example, an identifier of an LSW. The node identifier is used by the second node to determine a first node from which a data flow comes. The ingress port identifier is an identifier of a port through which a data packet flows into the first node. The egress port identifier is an identifier of a port through which a data packet flows out of the first node. A queue means that a queue algorithm is used to classify received data flows and then send the data flows in the queue according to a queue scheduling mechanism. Different data flows may correspond to different queues. A queue depth is a ratio of a buffer occupied by all data packets in the queue to a total buffer for the queue. For example, assuming that a total quantity N of buffer units allocated to a queue A of a port of the first node is 1000, and a quantity of buffer units occupied by all data packets in the buffer queue A is 360, a depth of the queue A of the first node is 360/1000=36%. Utilization of egress bandwidth for a queue is a ratio of bandwidth occupied by egress data packets in a queue to total egress bandwidth. For example, if bandwidth occupied by egress data packets in a queue 1 is 1G, and total egress bandwidth is 10G, utilization of egress bandwidth for the queue 1 is 1G/10G=10%. The forwarding latency of the data packet is a time interval from a time point at which the last bit of a data packet that needs to be forwarded enters an ingress port of the first node to a time point at which the first bit of the data packet appears on an egress port. A queue occupancy depth of a data flow is a length occupied by a data flow in a queue. For example, a queue depth is 10K, and a length of a data flow 1 is 1K, that is, a queue occupancy depth of the data flow 1 is 1K. The data flow identifier can uniquely identify a data flow. For example, the data flow identifier may be a 5-tuple, a 3-tuple, or another identifier that can uniquely identify a data flow. The 5-tuple usually includes a source internet protocol (IP) address, a source port, a destination IP address, a destination port, and a transport layer protocol, that is, a set of the five parameters: the source IP address, the source port, the destination IP address, the destination port, and the transport layer protocol. For example, a 5-tuple includes 192.168.1.1, 10000, TCP, 121.14.88.76, and 80. The 5-tuple means that a terminal whose IP address is 192.168.1.1 and whose port is 10000 is connected to a terminal whose IP address is 121.14.88.76 and whose port is 80 by using a TCP protocol. The data flow identifier is used by the second node to determine a data flow to which a data packet belongs. User-defined information includes, for example, vehicle control key data and a heartbeat message. The data type corresponding to the data packet is used by the second node to determine a priority of the data packet.

Table 1 shows defined meta information (metainfo), wherein Y represents "mandatory" and N represents "optional".

TABLE 1

Defined meta information

| Item | Item Description | Mandatory or Not | Bit-map |
|---|---|---|---|
| node_id | Node identifier | Y | 1 |
| iport_id | Ingress port identifier | Y | 2 |
| eport_id | Egress port identifier | Y | 3 |
| queue_id | Queue identifier | Y | 4 |
| queue_depth | Queue depth. | N | 5 |
| tx_bandwidth | Utilization of egress bandwidth for a queue | N | 6 |
| forward_latency | Forwarding latency of a data packet | Y | 7 |
| flow_max_latency | Maximum tolerable latency of a single packet | Y | 8 |
| flow_depth | Queue occupancy depth of a data flow | N | 1 |
| flow_id | Flow identifier | Y | 2 |
| flow_info_type | Data flow type (0: control plane; 1: management plane; 2: data plane; 3: Others) | Y | 3 |
| user defined info | User-defined information | N | 4 |

It should be noted that, a user may choose whether to configure optional items (for example, the queue depth, the utilization of the egress bandwidth for the queue, the queue occupancy depth of the data flow, and the user-defined information) in the meta information in Table 1, or the optional items may be configured based on a system default item. For example, it may be set by default by a system that the queue depth, the utilization of the egress bandwidth for the queue, and the queue occupancy depth of the data flow need to be configured in the optional items.

Figure 3B:
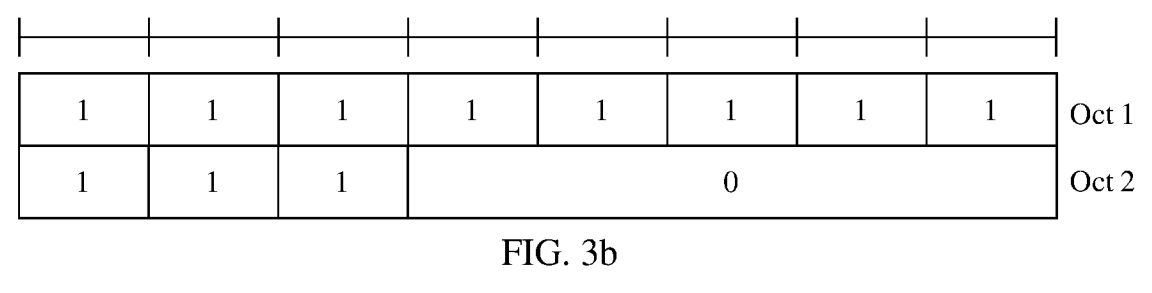

In a possible implementation, the meta information in Table 1 may be defined by an LSW, and optional items in the meta information that need to be configured may be set by default by a system or may be configured by a user on the second node. This is not limited in the embodiments. The optional items in the meta information may be sent to the first node in a bitmap form. For example, FIG. 3a is a schematic diagram of a structure of meta information in a bitmap form. A length of the structure of the metadata information may be fixed, for example, may be 16 bits. An item other than the user-defined information corresponds to 1 bit. "1" may be used to indicate "addition", and "0" may be used to indicate "not addition". The user-defined information may correspond to 5 bits. A bit in a bitmap corresponding to a mandatory item in the meta information may be 1. It should be noted that, the structure of the meta information may also be another bit quantity. In addition, other identifiers may also be used to indicate "addition" and "not addition". For example, if optional items in the meta information include a queue depth and a queue occupancy depth of a data flow, a structure of the meta information in the bitmap form is shown in FIG. 3b.

It should be noted that, one piece of meta information may be configured for the entire first node, one piece of meta information may be configured for each data flow, or one piece of meta information may be configured for each queue. This is not limited in the embodiments. One piece of meta information may be configured for the entire first node, to help improve processing efficiency of the first node.

Further, in a possible implementation, the user may configure the data flow identifier on the second node. A data flow corresponding to the data flow identifier is a data flow that needs to be monitored by the first node. For example, the first node may obtain meta information of each data packet in the data flow corresponding to the data flow identifier.

Further, in a possible implementation, the user may configure a feedback trigger condition on the second node. The following provides examples of possible feedback trigger conditions based on two cases.

Case 1: Data flow-based feedback trigger condition. The following three feedback trigger conditions may be included.

Feedback trigger condition 1: A forwarding latency of a data packet is greater than a maximum tolerable latency of a single packet. The maximum tolerable latency of the single packet may be 3 μs.

Feedback trigger condition 2: A quantity of received data packets is greater than a preset quantity.

Feedback trigger condition 3: One data packet is received each time (the feedback trigger condition 3 may be set by default by a system).

Case 2: Queue-based feedback trigger condition.

Feedback trigger condition 4: A queue depth is greater than a preset queue depth.

Feedback trigger condition 5: Utilization of egress bandwidth for a queue is greater than preset bandwidth utilization.

It should be noted that the feedback trigger condition may alternatively be a combination of the feedback trigger condition 1 and the feedback trigger condition 2, may be a combination of the feedback trigger condition 4 and the feedback trigger condition 5, may be a combination of the feedback trigger condition 1 and the feedback trigger condition 4, may be a combination of the feedback trigger condition 1 and the feedback trigger condition 5, may be a combination of the feedback trigger condition 2 and the feedback trigger condition 4, may be a combination of the feedback trigger condition 2 and the feedback trigger condition 5, may be a combination of the feedback trigger condition 1, the feedback trigger condition 2, and the feedback trigger condition 4, may be a combination of the feedback trigger condition 1, the feedback trigger condition 2, and the feedback trigger condition 5, may be a combination of the feedback trigger condition 2, the feedback trigger condition 4, and the feedback trigger condition 5, or may be a combination of the feedback trigger condition 1, the feedback trigger condition 2, the feedback trigger condition 4, and the feedback trigger condition 5.

It should be understood that, in step 201, the second node may send the feedback trigger condition, the meta information, and the data flow identifier to the first node together. Alternatively, the second node may separately send the feedback trigger condition, the meta information, and the data flow identifier to the first node. Alternatively, the second node may send any two of the feedback trigger condition, the meta information, and the data flow identifier to the first node together and separately send the other to the first node.

Step 202: The first node obtains a packet header of a to-be-transmitted data packet.

Herein, the to-be-transmitted data packet in the first node may be from the third node and/or the second node.

With reference to Scenario 1, if the first node is the LSW, the third node may be any one or more of the sensor 1 to the sensor 6 and/or the microcontroller unit, and the second node may be the chip. Based on Scenario 1, the to-be-transmitted data packet in the first node may be from any one or more of the sensor 1 to the sensor 6, the microcontroller unit, and/or the chip.

With reference to Scenario 2, if the first node is the LSW in the MDC-A system, the third node may be any one or more of the sensor 1 to the sensor 6 in the MDC-A system, the microcontroller unit in the MDC-A system, any one or more of the sensor 1 to the sensor 6 in the MDC-B system, the microcontroller unit in the MDC-B system, and/or the chip in the MDC-B system, and the second node may be the chip in the MDC-A system. Based on Scenario 2, the to-be-transmitted data packet in the first node may be from any one or more of the sensor 1 to the sensor 6 in the MDC-A system, the microcontroller unit in the MDC-A system, the chip in the MDC-A system, any one or more of the sensor 1 to the sensor 6 in the MDC-B system, the microcontroller unit in the MDC-B system, and/or the chip in the MDC-B system. The first node may alternatively be the LSW in the MDC-B system. For the corresponding third node and the corresponding second node, refer to the foregoing descriptions that the first node is the LSW in the MDC-A system. Details are not described herein again.

With reference to Scenario 3, if the first node may be the LSW in the MDC-B system, the third node may be any one or more of the sensor 1 to the sensor 6 in the MDC-B system, the microcontroller unit in the MDC-B system, any one or more of the sensor 1 to the sensor 6 in the MDC-A system, the microcontroller unit in the MDC-A system, the chip in the MDC-A system, any one or more of the sensor 1 to the sensor 6 in the MDC-C system, the microcontroller unit in the MDC-C system, and/or the chip in the MDC-C system, and the second node is the chip in the MDC-B system. Based on Scenario 3, the to-be-transmitted data packet in the first node may be from any one or more of the sensor 1 to the sensor 6 in the MDC-B system, the microcontroller unit in the MDC-B system, the chip in the MDC-B system, any one or more of the sensor 1 to the sensor 6 in the MDC-A system, the microcontroller unit in the MDC-A system, the chip in the MDC-A system, any one or more of the sensor 1 to the sensor 6 in the MDC-C system, the microcontroller unit in the MDC-C system, and/or the chip in the MDC-C system. It should be understood that the first node may alternatively be the LSW in the MDC-A system or the LSW in the MDC-C system. For the corresponding second node and the corresponding third node, refer to the foregoing descriptions that the first node is the LSW in the MDC-B system. Details are not described herein again.

In a possible implementation, the first node may obtain the packet header of the to-be-transmitted data packet based on a preset period (or frequency) of collecting a packet header of a data packet. The period (or frequency) of collecting a packet header of a data packet may be a period specified by the user or a default period of the system. Usually, the default period of the system is obtained for each data packet. Further, optionally, a length of a packet header of a collected data packet may be a length specified by the user or a default length of the system. Usually, the default length of the system is 64 bytes. The packet header of the data packet includes a source IP address, a destination IP address, a source port, a destination port, and a protocol type.

Step 203: The first node may determine, based on the data flow identifier and the obtained packet header, a first data packet corresponding to a same egress port from the to-be-transmitted data packet.

Herein, for example, the data flow identifier is a 5-tuple. The 5-tuple usually includes a source IP address, a destination IP address, a source port, a destination port, and a transport layer protocol. A packet header also includes a source IP address, a destination IP address, a source port, and a destination port. Then, the obtained packet header may be matched with the 5-tuple, to determine data packets that need to be monitored (that is, data packets whose meta information needs to be obtained). Further, based on destination IP addresses in a packet header of the data packets that are determined to be monitored, a table of a mapping relationship between a destination IP address and an egress port may be queried to determine the first data packet corresponding to the same egress port from the data packets that need to be monitored. It should be understood that there may be a plurality of determined first data packets.

With reference to Scenario 1, data packets corresponding to a flow 1 to a flow 5 all correspond to a same egress port of the first node. With reference to Scenario 2, data packets corresponding to a flow 1 to a flow 6 all correspond to a same egress port of the first node. With reference to Scenario 3, data packets corresponding to a flow 1 to a flow 4 all correspond to a same egress port of the first node.

Step 204: The first node may obtain, based on the meta information, a meta information value corresponding to the first data packet.

For each of the plurality of first data packets, the first node may obtain, based on the meta information, a meta information value corresponding to each first data packet.

For example, if the meta information includes a queue depth, utilization of egress bandwidth for a queue, a queue occupancy depth of a data flow to which a first data packet belongs, a node identifier, an ingress port identifier, an egress port identifier, a queue identifier, a forwarding latency of the data packet, a maximum tolerable latency of a single packet, a data flow identifier corresponding to the data packet, and a data type corresponding to the data packet, for each first data packet, the first node needs to obtain the meta information value that is of the meta information and that corresponds to each first data packet. The following provides a possible manner of obtaining the meta information value corresponding to the first data packet.

For example, for a forwarding latency of the first data packet, when the last bit of the first data packet enters a port of the first node, the first node records a first moment, and when the first bit of the first data packet appears on an egress port of the first node, the first node records a second moment. In this case, the forwarding latency of the first data packet is equal to a difference between the second moment and the first moment. For another example, for a data flow identifier corresponding to the first data packet, the first node may determine, based on a packet header of the first data packet, a data flow corresponding to the first data packet. For another example, for a queue depth corresponding to the first data packet, the first node may determine a queue depth of a queue in which a data flow corresponding to the first data packet is located. For another example, for utilization of egress bandwidth for a queue corresponding to the first data packet, the first node may determine a queue in which a data flow corresponding to the first data packet is located, determine bandwidth occupied by an egress data packet in the queue, and determine a ratio of the bandwidth to total egress bandwidth. For another example, for a queue occupancy depth of a data flow corresponding to the first data packet, the first node may determine a length of the data flow corresponding to the first data packet. For another example, for a data type corresponding to the first data packet, the first node may determine, based on a customized field after a protocol layer header, the data type corresponding to the first data packet.

Step 205: When determining that the feedback trigger condition is met, the first node encapsulates the meta information value corresponding to the first data packet and the packet header of the first data packet into a second data packet and sends the second data packet to the second node. Correspondingly, the second node receives the second data packet from the first node.

Based on the feedback trigger conditions in Case 1 and Case 2, the following three implementations of determining whether the feedback trigger condition is met may be provided.

Implementation 1: The first node determines, based on the meta information value corresponding to the first data packet, whether the feedback trigger condition is met.

In Implementation 1, when the feedback trigger condition is any one or more of the feedback trigger condition 1, the feedback trigger condition 4, and the feedback trigger condition 5, the first node may determine, based on the meta information value corresponding to the first data packet, whether the feedback trigger condition is met. For example, the feedback trigger condition is the feedback trigger condition 1. When determining that the forwarding latency in the meta information value corresponding to the first data packet is greater than the maximum tolerable latency of the single packet, the first node determines that the feedback trigger condition is met. For another example, the feedback trigger condition is the feedback trigger condition 4. When determining that the queue depth in the meta information value corresponding to the first data packet is greater than the preset queue depth, the first node determines that the feedback trigger condition is met. For another example, the feedback trigger condition is the feedback trigger condition 9. When determining that the utilization that is of the egress bandwidth for the queue and that is in the meta information value corresponding to the first data packet is greater than the preset bandwidth utilization, the first node determines that the feedback trigger condition is met.

Implementation 2: The first node determines, based on statistical information about first data packets, whether the feedback trigger condition is met.

In Implementation 2, when the feedback trigger condition is the feedback trigger condition 2, the first node may collect statistics about a quantity of first data packets received within preset duration, and when the quantity is greater than a preset quantity, determine that the feedback trigger condition is met.

Implementation 3: Each time a first data packet is received, the first node determines that the feedback trigger condition is met.

In Implementation 3, when the feedback trigger condition is the feedback trigger condition 3, each time one first data packet is received, the first node determines that the feedback trigger condition is met. It should be noted that the feedback trigger condition may be set by default by the system.

After determining that the feedback trigger condition is met, the first node may encapsulate the meta information value corresponding to the first data packet and the packet header of the first data packet into the second data packet. The following provides two possible encapsulation manners of the second data packet.

Manner 1: The first node encapsulates a meta information value corresponding to one first data packet and a packet header of the first data packet into one second data packet.

In a possible implementation, the first node may add the meta information value corresponding to the first data packet before the packet header of the first data packet and add a new packet header before the meta information value corresponding to the first data packet, to obtain the second data packet, where a destination address in the new packet header is an address of the second node. For example, a format of the second data packet may be: OuterL3+UDP/TCP/Others+ metainfo Header+Inner L2+Inner L3+Inner L4. Inner L2+Inner L3+Inner L4 are the obtained packet header of the first data packet, UDP and TCP are packet headers of transport layer protocols, Others is a packet header of another protocol type, and OuterL3 is a newly added packet header, that is, an IP address of the second node is set at OuterL3. In this way, the first node may determine, by using the new packet header, that the second data packet needs to be sent to the second node, may determine, based on the meta information value, whether rate reduction processing needs to be performed, and further, may determine, based on the packet header of the first data packet, a data flow to which the first data packet corresponds, that is, determine a data flow on which rate reduction processing needs to be performed.

Manner 2: The first node encapsulates meta information values and a packet header that respectively correspond to a plurality of first data packets into one second data packet.

For example, the plurality of first data packets are a first data packet A and a first data packet B. The first node may encapsulate a meta information value A and a packet header A corresponding to the first data packet A and a meta information value B and a packet header B corresponding to the first data packet B into one second data packet. The first node may add the meta information value A corresponding to the first data packet A before the packet header A, and add the meta information value B corresponding to the first data packet B before the packet header B. The meta information value A, the packet header A, the meta information value B, and the packet header B may share a new packet header, and a destination address in the new packet header is an address of the second node. For example, a format of the second data packet is: OuterL3+UDP/TCP/Others+(metainfo A Header+ Inner L2+Inner L3+Inner L4)+(metainfo B Header+Inner L2+Inner L3+Inner L4).

To enable the second data packet to be sent to the second node in a timely manner, the first node may modify a priority of the second data packet to be greater than a priority threshold. For example, the first node may modify the priority of the second data packet to 7.

It should be noted that, after step 203 and before step 204, the first node may further copy (for example, mirror) the packet header of the first data packet to an egress port corresponding to the first data packet, so that the first node performs subsequent steps based on the obtained packet header. In addition, normal forwarding of the original first data packet may not be affected.

Step 206: The second node receives M second data packets from the first node, where M is an integer greater than or equal to 1.

Herein, the second data packet carries the packet header of the first data packet and the meta information value corresponding to the first data packet. Based on Manner 1, M is an integer greater than 1. In a sampling period, the second node may receive a plurality of second data packets from the first node, where each second data packet carries a packet header of one first data packet and a meta information value corresponding to the first data packet. Based on Manner 2, M may be an integer equal to 1. In a sampling period, the second node may receive one second data packet from the first node, where the second data packet may carry packet headers and meta information values respectively corresponding to a plurality of first data packets. It should be understood that, based on Implementation 2, M may also be an integer greater than 1.

Step 207: The second node may determine a target data flow based on the M second data packets and a rate reduction condition, where the target data flow is at least one of the one or more data flows corresponding to the M second data packets.

In a possible implementation, the rate reduction condition may include any one of a first condition, a second condition, and a third condition. Example 1: The first condition is based on a data flow. In a sampling period, an average value of forwarding latencies in meta information values respectively corresponding to k first data packets belonging to a same data flow may be greater than a first preset value, where k is an integer less than or equal to M. Example 2: The second condition is based on a queue. In the sampling period, an average value of queue occupancy depth that are of data flows and that are in the meta information values respectively corresponding to the k first data packets belonging to the same data flow may be greater than a second preset value. Example 3: The third condition is based on a queue. In the sampling period, an average value of queue depths in the meta information values respectively corresponding to the k first data packets belonging to the same data flow may be greater than a third preset value.

In a possible implementation, the M second data packets received by the second node may correspond to one data flow, or may correspond to a plurality of data flows, where each data flow may include k second data packets. When the M second data packets correspond to one data flow, k is an integer less than or equal to M. When the M second data packets correspond to a plurality of data flows, k is an integer less than M.

In a possible implementation, the first node may determine, based on the packet header that is of the first data packet and that is carried in the second data packet, which second data packets in the M second data packets correspond to a same data flow. Based on the determined correspondence between the M second data packets and the data flow, an implementation process of determining the target data flow may be described in detail in the following two cases.

Case 1: The M second data packets correspond to one data flow

Based on a scenario in which the rate reduction condition is the first condition, if the second node determines that an average value of forwarding latencies (average_flow_latency) in meta information values that correspond to first data packets and that are respectively carried in k second data packets in the M second data packets is greater than the first preset value, the second node determines the data flow corresponding to the M second data packets as the target data flow. For example, Average value of the forwarding latencies=(Forwarding latency 1+Forwarding latency 2+ . . . , +Forwarding latency k)/k.

Based on a scenario in which the rate reduction condition is the second condition, if the second node determines that an average value of queue occupancy depths that are of data flows (average_flow_depth) and that are in meta information values that correspond to first data packets and that are respectively carried in k second data packets in the M second data packets is greater than the second preset value, the second node determines the data flow corresponding to the M second data packets as the target data flow. For example, Average value of the queue occupancy depths of the data flows=(Queue occupancy depth 1 of a data flow+Queue occupancy depth 2 of a data flow+ . . . , +Queue occupancy depth k of a data flow)/k.

Based on a scenario in which the rate reduction condition is the third condition, if the second node determines that an average value of queue depths (average_queue_depth) in meta information values that correspond to first data packets and that are respectively carried in k second data packets in the M second data packets is greater than the third preset value, the second node determines the data flow corresponding to the M second data packets as the target data flow. For example, Average value of the queue depths=(Queue depth 1+Queue depth 2+ . . . , +Queue depth k)/k.

Case 2: The M second data packets correspond to a plurality of data flows.

Based on a scenario in which the rate reduction condition is the first condition, the second node determines an average value of forwarding latencies in meta information values that correspond to first data packets and that are respectively carried in k second data packets in each data flow, and determines a data flow in which the average value of the forwarding latencies is greater than the first preset value and whose priority is the lowest as the target data flow.

In a possible implementation, there is a mapping relationship between a queue identifier and a priority of a queue. There may be a mapping relationship between the queue identifier and a priority of a data flow in the queue. Therefore, the second node may determine, based on queue identifiers in the meta information values that correspond to the first data packet and that are carried in the k second data packets, a priority of a data flow corresponding to the k second data packets. For example, if a queue identifier in the meta information value is 1, it may indicate that a priority of the data flow is 1. If a queue identifier in the meta information value is 2, it may indicate that a priority of the data flow is 2.

Based on a scenario in which the rate reduction condition is the second condition, the second node determines an average value of queue occupancy depths that are of data flows and that are in meta information values that correspond to first data packets and that are respectively carried in k second data packets in each data flow, and determines a data flow in which the average value of the queue occupancy depths of the data flows is greater than the second preset value and whose priority is the lowest as the target data flow. It should be noted that, for determining the priority of the data flow, refer to the foregoing descriptions. Details are not described herein again.

Based on a scenario in which the rate reduction condition is the third condition, the second node determines an average value of queue depths in meta information values that correspond to first data packets and that are respectively carried in k second data packets in each data flow, and determines a data flow in which the average value of the queue depths is greater than the third preset value and whose priority is the lowest as the target data flow. It should be noted that, for determining the priority of the data flow, refer to the foregoing descriptions. Details are not described herein again.

For example, descriptions are provided by using an example in which a plurality of data flows are a data flow a and a data flow b, a priority of the data flow a is 1, and a priority of the data flow b is 2. If an average value of forwarding latencies of first data packets corresponding to the data flow a is greater than the first preset value, an average value of forwarding latencies of first data packets corresponding to the data flow b is not greater than the first preset value, and the priority of the data flow b is higher than the priority of the data flow a, it may be determined that the data flow a is the target data flow. If the average value of the forwarding latencies of the data flow a is not greater than the first preset value, and the average value of the forwarding latencies of the data flow b is not greater than the first preset value, rate reduction processing may not be performed.

Further, optionally, for data flows with a same priority, the target data flow may be determined based on a data type corresponding to a data packet. A sequence in which data flows corresponding to control plane data, management plane data, and data plane data are determined as target data flows is: a data flow on a data plane>a data flow on a management plane>a data plane on a control plane, that is, the data plane>the management plane>the control plane.

In the implementation of Case 2, rate reduction to be performed on a data flow with a low priority is notified, to help prevent congestion in advance. Further, for data flows with a same priority, a transmission rate of the data flow on the data plane is preferentially reduced, so that it can be determined that important data on the control plane can be forwarded in a timely manner, to help ensure that key control plane information of an ADAS is processed in a timely manner.

Step 208: The second node may reduce a transmission rate of the target data flow in a rate reduction manner, or send indication information to the third node, where the indication information is used to indicate the third node to reduce the transmission rate of the target data flow in the rate reduction manner.

Herein, the rate reduction manner may be predefined by the second node. If the second node receives only one data flow and determines that the data flow meets the rate reduction condition, the second node may perform rate reduction processing on the data flow in a preset rate reduction manner based on the rate reduction condition. If the second node receives a plurality of data flows, rate reduction processing may be performed on a data flow meeting the rate reduction condition. Further, if there are two or more data flows meeting the rate reduction condition, rate reduction may be performed on a data flow with a lowest priority. If priorities are the same, a source end of the data flow may be notified to perform rate reduction according to a principle in which the data plane data>the management plane data>the control plane data.

For example, if the target data flow is determined based on the first condition, the rate reduction manner is reducing the transmission rate of the target data flow by a first percentage (X %). If the target data flow is determined based on the second condition, the rate reduction manner is reducing the transmission rate of the target data flow by a second percentage (Y %). If the target data flow is determined based on the third condition, the rate reduction manner is reducing the transmission rate of the target data flow by a third percentage (Z %). It should be noted that the first percentage, the second percentage, and the third percentage may be the same or different. This is not limited in the embodiments.

In a possible implementation, the indication information may indicate the rate reduction manner by using one or more pieces of bit information. For example, if the bit information is "00", a corresponding rate reduction manner is reducing the transmission rate of the target data flow by the first percentage. If the bit information is "01", a corresponding rate reduction manner is reducing the transmission rate of the target data flow by the second percentage. If the bit information is "10", a corresponding rate reduction manner is reducing the transmission rate of the target data flow by the third percentage. In another possible implementation, the indication information indicates the rate reduction manner by using identifier information. For example, if the identifier information in the indication information is 1, a corresponding rate reduction manner is reducing the transmission rate of the target data flow by the first percentage. If the identifier information in the indication information is 2, a corresponding rate reduction manner is reducing the transmission rate of the target data flow by the second percentage. If the identifier information in the indication information is 3, a corresponding rate reduction manner is reducing the transmission rate of the target data flow by the third percentage.

It should be noted that, the bit information or the identifier information is merely an example. The indication information may alternatively indicate the rate reduction manner by using another form of bit information or identifier information. This is not limited in the embodiments.

It should be further noted that, in Scenario 2, the MDC-A system and the MDC-B system may independently perform the method shown in FIG. 2. The first node and the second node in the MDC-A system may perform the solution shown in FIG. 2 on data packets corresponding to the flow 1 to the flow 6 corresponding to a same egress port. The first node and the second node in the MDC-B system may perform the solution shown in FIG. 2 on a data packet corresponding to the flow 6. In Scenario 3, the MDC-A system, the MDC-B system, and the MDC-C system may independently perform the method shown in FIG. 2. The first node and the second node in the MDC-A system may perform the solution shown in FIG. 2 on a data packet corresponding to the flow 3. The first node and the second node in the MDC-B system may perform the solution shown in FIG. 2 on data packets corresponding to the flow 1 to the flow 4 corresponding to a same egress port. The first node and the second node in the MDC-C system may perform the solution shown in FIG. 2 on data packets corresponding to the flow 1 and the flow 4. Each MDC system independently performs the method shown in FIG. 2, to help further reduce a possibility of congestion in a multi-system interconnection scenario.

It can be learned from step 201 to step 208 that the first node may encapsulate, based on a requirement, meta information values and a packet header corresponding to the first data packet corresponding to the same egress port into a second data packet, and feed back the second data packet to the second node. The second node determines, based on the second data packet, whether there is a data flow on which rate reduction processing needs to be performed, and if there is the data flow on which rate reduction processing needs to be performed, the second node notifies a source end (for example, the first node or the third node) to perform rate reduction processing on the data flow on which rate reduction processing needs to be performed. In this way, congestion can be prevented in advance, to help reduce a forwarding latency of a data packet, and further help reduce a packet loss rate of an egress port. Especially in a traffic burst scenario in which a plurality of ingress ports corresponds to a single egress port, it can be ensured that high-priority data packets are forwarded in a timely manner.

Figure 4:
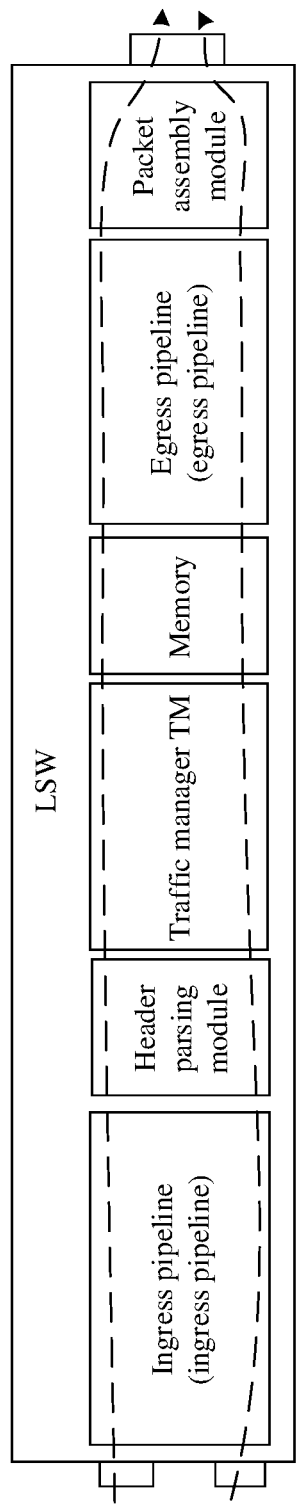
FIG. 4 is a schematic diagram of a structure of an LSW.

FIG. 4 is a schematic diagram of a structure of an LSW. The LSW includes an ingress pipeline, a header parsing module, a memory, a traffic manager (traffic monitor, TM), an egress pipeline, and a packet assembly module. The ingress pipeline is configured to: receive a data packet and place the received data packet into a buffer of the LSW. The header parsing module is configured to parse a packet header of a data packet, to obtain some information (such as a source MAC address, a destination MAC address, a packet type, a source IP address, and a destination IP address) of the data packet. Based on the obtained information, the received data packets may be divided into different data flows, and different processing may be performed on the different data flows. The TM is responsible for managing traffic (that is, data flows) on an ingress port and an egress port. For example, the TM may be responsible for measuring traffic of incoming data packets, and then process, based on preset information, a data packet exceeding a traffic limit. The memory may be configured to store a forwarding table, where the forwarding table includes a table of a mapping relationship between a destination address and an egress port, meta information, and the like. The egress pipeline is configured to: transmit a to-be-forwarded data packet to the packet assembly module for packet assembly, and then forward the data packet to the destination. The data flows received or sent by the LSW may be completed by the ingress pipeline, the egress pipeline, the TM, and the memory through cooperation.

For ease of description, an example in which the first node is an LSW, the second node is an AI chip, and the third node is a sensor 1 and a sensor 2 is used below. In other words, in the following descriptions, the LSW may be replaced with the first node, the AI chip may be replaced with the second node, and both the sensor 1 and the sensor 2 may be replaced with the third node.

Figure 5A:
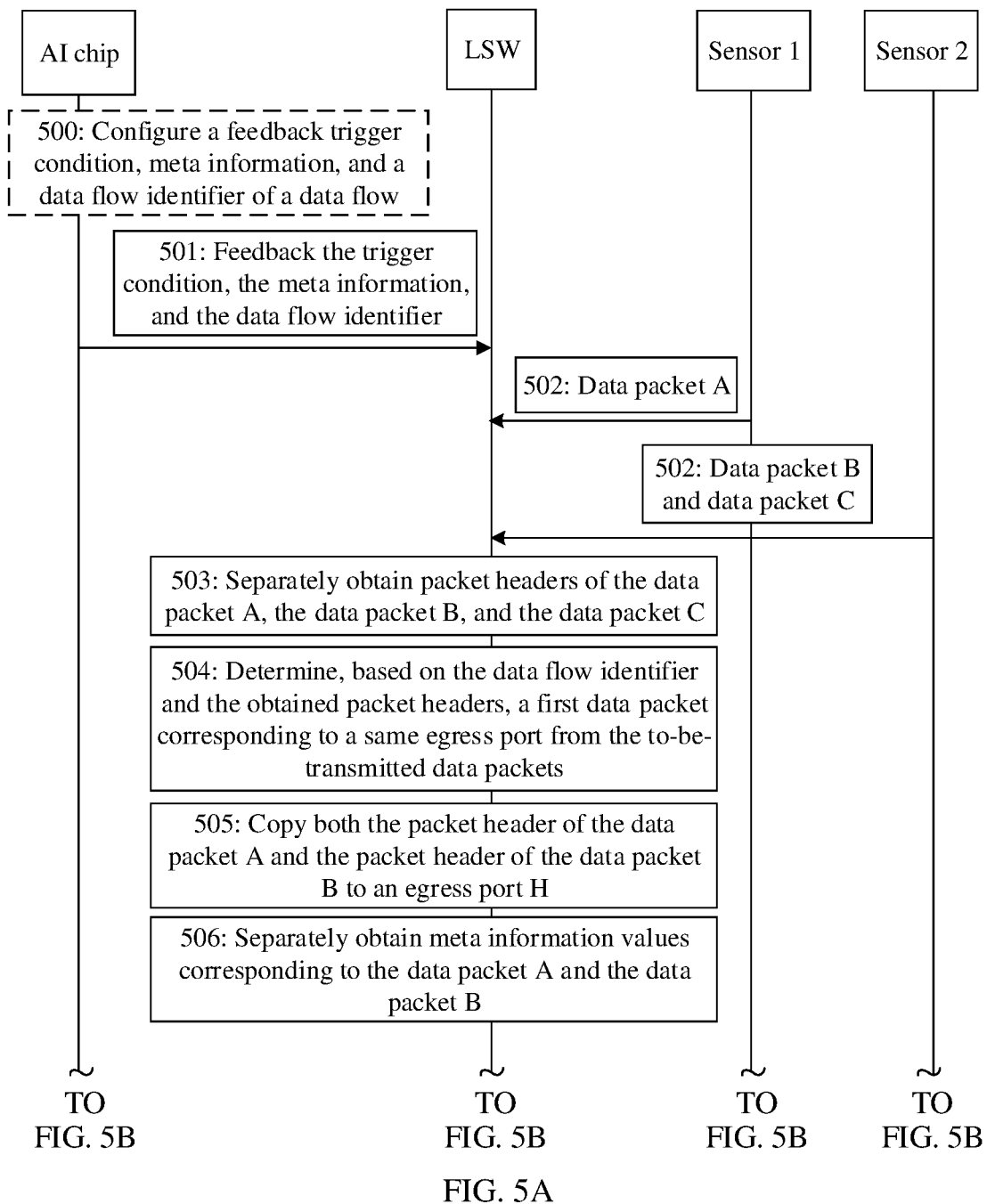
FIG. 5A and FIG. 5B are a schematic flowchart of another data transmission control method.
Figure 5B:
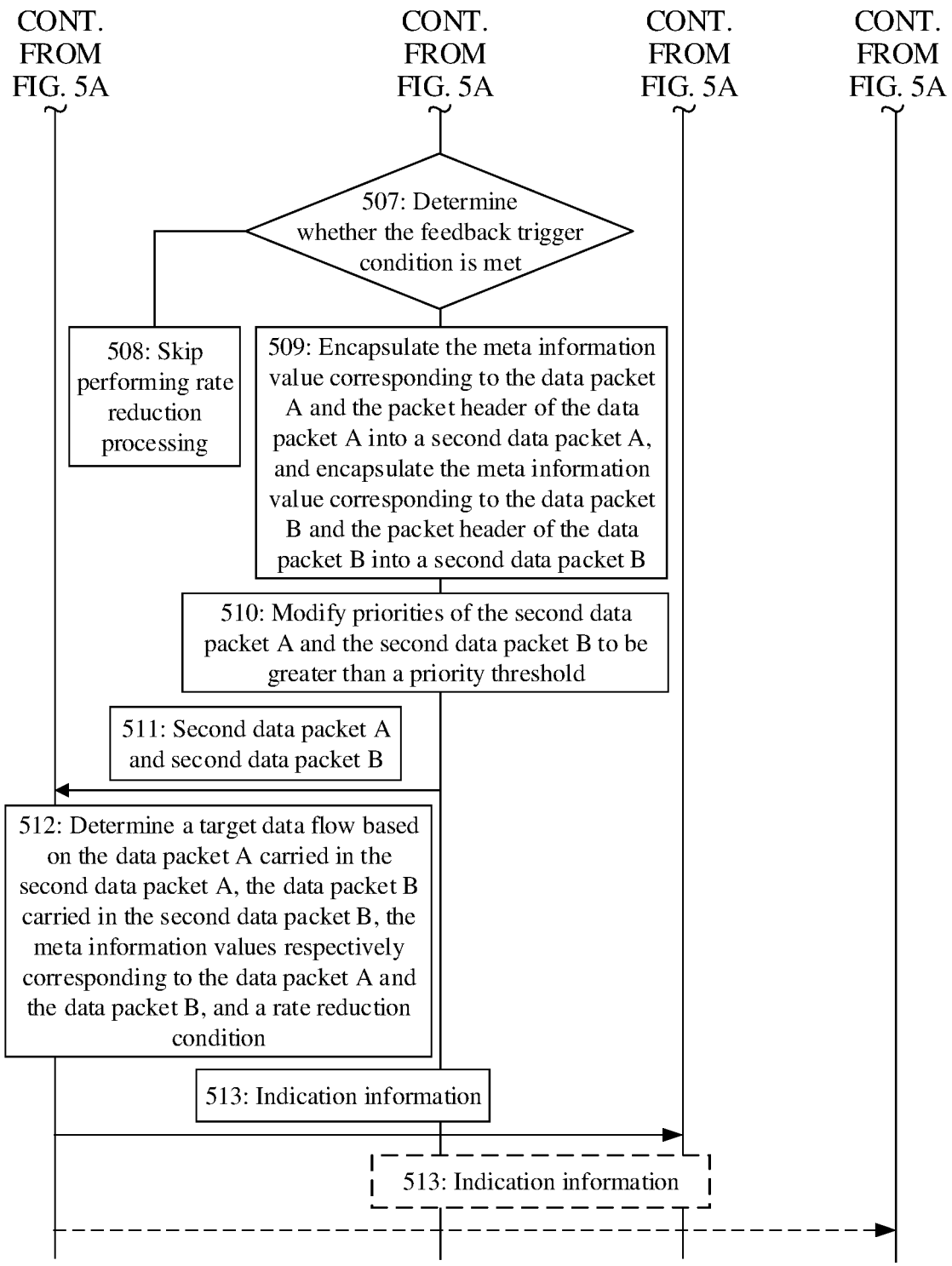

The following further describes the data transmission control method in detail with reference to Scenario 1 and the LSW shown in FIG. 4, to further understand an implementation process of the data transmission method. FIG. 5A and FIG. 5B are a schematic flowchart of another data transmission control method. In this embodiment, descriptions are provided by using a case in which a second node sends a feedback trigger condition, meta information, and a data flow identifier of a data flow to a first node as an example. The method includes the following steps.

Step 500: An AI chip configures a feedback trigger condition, meta information, and a data flow identifier of a data flow.

Step 500 is optional.

Herein, for detailed descriptions of the feedback trigger condition, the meta information, and the data flow identifier, refer to the descriptions in step 201. Details are not described herein again. For ease of description of the solution, an example in which data flow identifiers are 1 and 2 is used below. A data flow whose data flow identifier is 1 (which may be referred to as a data flow 1) includes a data packet A, and a data flow whose data flow identifier is 2 (which may be referred to as a data flow 2) includes a data packet B.

Step 501: The AI chip sends the feedback trigger condition, the meta information, and the data flow identifier to an LSW. Correspondingly, the LSW receives the feedback trigger condition, the meta information, and the data flow identifier from the AI chip.

Further, optionally, the LSW may store the received feedback trigger condition, the received meta information, and the received data flow identifier in a memory of the LSW.

Herein, the AI chip may send the feedback trigger condition, the meta information, and the data flow identifier to the LSW together. Alternatively, the AI chip may separately send the feedback trigger condition, the meta information, and the data flow identifier to the LSW. Alternatively, the AI chip may send any two of the feedback trigger condition, the meta information, and the data flow identifier to the LSW together and separately send the other to the LSW.

Step 502: The LSW receives a data packet A from a sensor 1, and a data packet B and a data packet C from a sensor 2.

With reference to FIG. 4, the LSW may receive the data packet A from the sensor 1, and the data packet B and the data packet C from the sensor 2 by using the ingress pipeline. The data packet A, the data packet B, and the data packet C may be to-be-transmitted data packets of the LSW.

Step 503: The LSW separately obtains packet headers of the data packet A, the data packet B, and the data packet C.

Herein, the packet header of the data packet A, the data packet B, and the data packet C each include a source IP address, a destination IP address, a source port, a destination port, and a protocol type.

Step 504: The LSW may determine, based on the data flow identifier and the obtained packet headers, a first data packet corresponding to a same egress port from the to-be-transmitted data packet.

Herein, the LSW may separately match the packet header of the received data packet A, the received data packet B, and the received data packet C with the data flow 1 and the data flow 2, to determine that the data packet A corresponds to the data flow 1, and the data packet B corresponds to the data flow 2. Further, the LSW may query a table of a mapping relationship between a destination IP address and an egress port to determine that the data packet A and the data packet B correspond to the same egress port of the LSW. Both the data packet A and the data packet B may be the first data packet. The table of the mapping relationship between the destination IP address and the egress port may be stored in the memory of the LSW. For example, descriptions are provided below by using an example in which the data packet A and the data packet B correspond to a same egress port H.

Step 505: The LSW copies both the packet header of the data packet A and the packet header of the data packet B to the egress port H.

In a possible implementation, the packet header of the data packet A and the packet header of the data packet B may be mirrored to the egress port H.

Step 506: The LSW separately obtains meta information values corresponding to the data packet A and the data packet B.

For step 506, refer to the descriptions of step 204. Details are not described herein again.

Step 507: The LSW determines whether the feedback trigger condition is met and performs step 508 if the feedback trigger condition is not met; or performs step 509 if the feedback trigger condition is met.

Herein, for details that the LSW determines whether the feedback trigger condition is met, refer to the descriptions of Implementation 1, Implementation 2, and Implementation 3 in step 205.

Step 508: Skip performing rate reduction processing.

Step 509: The LSW encapsulates the meta information value corresponding to the data packet A and the packet header of the data packet A into a second data packet A, and encapsulates the meta information value corresponding to the data packet B and the packet header of the data packet B into a second data packet B.

For example, the meta information value corresponding to the data packet A is added before the packet header of the data packet A, and a new packet header is added before the meta information value corresponding to the data packet A, to be encapsulated into the second data packet A. The meta information value corresponding to the data packet B is added before the packet header of the data packet B, and a new packet header is added before the meta information value corresponding to the data packet B, to be encapsulated into the second data packet B. Herein, a destination IP address in the new packet header added by the LSW is an IP address of the AI chip.

Step 510: The LSW modifies priorities of the second data packet A and the second data packet B to be greater than a priority threshold.

Herein, the egress pipeline in the LSW may submit the second data packet A and the second data packet B to a special ingress port. The special ingress port supports any modification of a priority of the second data packet in an egress pipeline direction, and an egress port can be searched again to complete a forwarding procedure of the second data packet.

Step 511: The LSW sends the second data packet A and the second data packet B to the AI chip. Correspondingly, the AI chip receives the second data packet A and the second data packet B from the LSW.

In step 511, the LSW may send the second data packet A and the second data packet B to the AI chip based on the modified priorities of the second data packet A and the second data packet B.

Based on step 500 to step 510, in a sampling period, the AI chip may receive M second data packets from the LSW, and then the AI chip may perform step 512 and step 512.

Step 512: The AI chip may determine a target data flow based on the data packet A carried in the second data packet A, the data packet B carried in the second data packet B, the meta information values respectively corresponding to the data packet A and the data packet B, and a rate reduction condition.

For a manner of determining the target data flow, refer to the descriptions in step 207. Details are not described herein again.

Step 513: The AI chip may send indication information to a third node in a rate reduction manner, where the indication information is used to indicate a sensor 1 or a sensor 2 to reduce a transmission rate of the target data flow in the rate reduction manner.

For example, if the target data flow determined in step 512 is a data flow corresponding to the data packet A, the AI chip sends the indication information to the sensor 1. If the target data flow determined in step 512 is a data flow corresponding to the data packet B, the AI chip sends the indication information to the sensor 2.

It can be learned from step 500 to step 513 that before congestion occurs in a system, the LSW may feed back, to the AI chip based on a requirement, the meta information and the packet header corresponding to the first data packet corresponding to the same egress port. The AI chip determines, based on the second data packet, whether there is a data flow on which rate reduction processing needs to be performed, and if the AI chip determines that there is the data flow on which rate reduction processing needs to be performed, the AI chip notifies a source end (the sensor or the LSW) to perform rate reduction processing on the determined data flow. In this way, congestion can be prevented in advance, to help reduce a forwarding latency of a data packet, and further help reduce a packet loss rate of an egress port. Especially in a traffic burst scenario in which a plurality of ingress ports corresponds to a single egress port, it can be ensured that high-priority data packets are forwarded in a timely manner.

Figure 6:
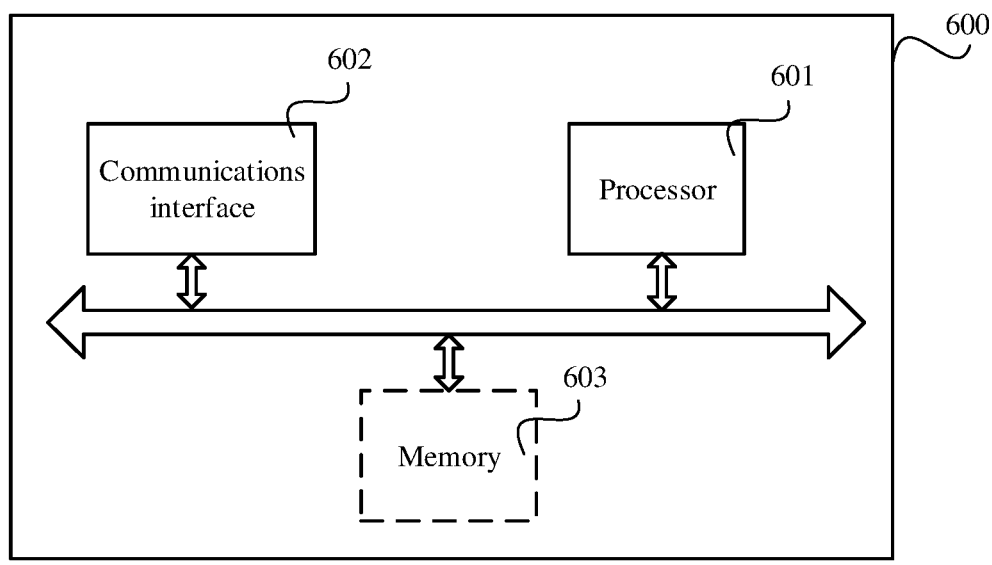
FIG. 6 is a schematic diagram of a structure of an apparatus.

Based on the foregoing content and a same concept, an apparatus 600 may be configured to perform any solution on the first node side or any solution on the second node side in the foregoing method. FIG. 6 shows an example of a schematic diagram of a structure of an apparatus. As shown in FIG. 6, the apparatus 600 includes a processor 601 and a communications interface 602. Optionally, the apparatus 600 may further include a memory 603. The processor 601, the communications interface 602, and the memory 603 are connected to each other through a bus. The apparatus 600 in this example may execute the solution in FIG. 2 or may execute the solution in FIG. 5A and FIG. 5B.

The memory 603 may include a volatile memory, for example, a random access memory (RAM). Alternatively, the memory may include a non-volatile memory, for example, a flash memory, a hard disk drive (HDD), or a solid-state drive (SSD). Alternatively, the memory 603 may include a combination of the foregoing types of memories.

The communications interface 602 may be a wired communications interface, a wireless communications interface, or a combination thereof. The wired communications interface may be, for example, an Ethernet interface. The Ethernet interface may be an optical interface, an electrical interface, or a combination thereof. The wireless communications interface may be a WLAN interface.

The processor 601 may be a central processing unit (CPU), a network processor (NP), or a combination of a CPU and an NP. The processor 601 may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof.

Optionally, the memory 603 may be further configured to store program instructions, and the processor 601 may invoke the program instructions stored in the memory 603 to perform one or more of the steps in embodiments shown in the foregoing solution, or an optional implementation, so that the apparatus 600 implements the foregoing method.

The processor 601 may be configured to: determine a feedback trigger condition, meta information, and a data flow identifier of a data flow; obtain a packet header of a to-be-transmitted data packet; determine, based on the data flow identifier and the obtained packet header, first data packets corresponding to a same egress port from the to-be-transmitted data packet; obtain, based on the meta information, a meta information value corresponding to the first data packet; and when determining that the feedback trigger condition is met, encapsulate the meta information value corresponding to the first data packet and a packet header of the first data packet into a second data packet, and send the second data packet to a second node through the communications interface 602, where the second data packet is used to enable the second node to reduce a transmission rate of at least one data flow in data flows corresponding to the first data packet, or send indication information to a third node, where the indication information is used to indicate the third node to reduce a transmission rate of at least one data flow in data flows corresponding to the first data packet.

In a possible implementation, the processor 601 may be configured to: add the meta information value corresponding to the first data packet before the packet header of the first data packet; and add a new packet header before the meta information value corresponding to the first data packet, to obtain the second data packet, where a destination address in the new packet header is an address of the second node.

In a possible implementation, the processor 601 is further configured to modify a priority of the second data packet to be greater than a priority threshold.

In a possible implementation, the meta information includes at least one of a node identifier, an ingress port identifier, an egress port identifier, a queue identifier, a forwarding latency of a data packet, a maximum tolerable latency of a single packet, a data flow identifier corresponding to the data packet, and a data type corresponding to the data packet, and the data type includes control plane data, management plane data, and data plane data.

In a possible implementation, the feedback trigger condition includes any one or more of the following: a forwarding latency of the first data packet is greater than the maximum tolerable latency of the single packet; a quantity of received first data packets is greater than a preset quantity; a queue depth is greater than a preset queue depth; and utilization of egress bandwidth for a queue is greater than preset bandwidth utilization, where the queue depth is a ratio of a buffer occupied by all data packets in the queue to a total buffer for the queue.

In a possible implementation, the meta information further includes the queue depth and/or the utilization of the egress bandwidth for the queue. The processor 601 may be configured to determine, based on the meta information value corresponding to the first data packet, that the feedback trigger condition is met.

In a possible implementation, the to-be-transmitted data packet are from the third node and/or the second node.

In a possible implementation, the communications interface 602 is further configured to receive the feedback trigger condition, the meta information, and the data flow identifier that are configured by the second node.

The communications interface 602 may be configured to receive M second data packets from a first node, where M is an integer greater than or equal to 1; and the second data packet is sent by the first node to a second node when the first node determines that a feedback trigger condition is met, the second data packet carries a packet header of a first data packet and a meta information value corresponding to the first data packet, and the first data packet is determined by the first node from a to-be-transmitted data packet based on a data flow identifier of a data flow. The processor 601 is configured to: determine a target data flow based on meta information values that correspond to first data packets and that are respectively carried in the M second data packets and a rate reduction condition, where the target data flow is at least one of the one or more data flows corresponding to the M second data packets; and reduce a transmission rate of the target data flow in a rate reduction manner, or send indication information to a third node through the communications interface 602, where the indication information is used to indicate the third node to reduce the transmission rate of the target data flow in the rate reduction manner.

In a possible implementation, the communications interface 602 is further configured to send, to the first node, the feedback trigger condition, meta information, and the data flow identifier that are configured.

In a possible implementation, the meta information further includes a queue depth and a queue occupancy depth that is of a data flow and that corresponds to the first data packet. The rate reduction condition includes any one of a first condition, a second condition, and a third condition. The first condition is that in a sampling period, an average value of forwarding latencies in meta information values respectively corresponding to k first data packets belonging to a same data flow is greater than a first preset value, where k is an integer less than or equal to M. The second condition is that in the sampling period, an average value of queue occupancy depths that are of data flows and that are in the meta information values respectively corresponding to the k first data packets belonging to the same data flow is greater than a second preset value. The third condition is that in the sampling period, an average value of queue depths in the meta information values respectively corresponding to the k first data packets belonging to the same data flow is greater than a third preset value.

In a possible implementation, the M second data packets correspond to one data flow. The processor 601 may be configured to: if determining that an average value of forwarding latencies in meta information values that correspond to first data packets and that are respectively carried in k second data packets in the M second data packets is greater than the first preset value, determine the data flow corresponding to the M second data packets as the target data flow; or if determining that an average value of queue occupancy depths that are of data flows and that are in meta information values that correspond to first data packets and that are respectively carried in k second data packets in the M second data packets is greater than the second preset value, determine the data flow corresponding to the M second data packets as the target data flow; or if determining that an average value of queue depths in meta information values that correspond to first data packets and that are respectively carried in k second data packets in the M second data packets is greater than the third preset value, determine the data flow corresponding to the M second data packets as the target data flow.

In a possible implementation, k is an integer less than M, the M second data packets correspond to a plurality of data flows, and each data flow includes at least k second data packets. The processor 601 may be configured to: determine an average value of forwarding latencies in meta information values that correspond to first data packets and that are respectively carried in the k second data packets in each data flow, and determine a data flow in which the average value of the forwarding latencies is greater than the first preset value and whose priority is the lowest as the target data flow; or determine an average value of queue occupancy depths that are of data flows and that are in meta information values that correspond to first data packets and that are respectively carried in the k second data packets in each data flow, and determining a data flow in which the average value of the queue occupancy depths of the data flows is greater than the second preset value and whose priority is the lowest as the target data flow; or determine an average value of queue depths in meta information values that correspond to first data packets and that are respectively carried in the k second data packets in each data flow, and determine a data flow in which the average value of the queue depths is greater than the third preset value and whose priority is the lowest as the target data flow.

In a possible implementation, the rate reduction manner includes any one of the following: if the target data flow is determined based on the first condition, reducing the transmission rate of the target data flow by a first percentage; if the target data flow is determined based on the second condition, reducing the transmission rate of the target data flow by a second percentage; or if the target data flow is determined based on the third condition, reducing the transmission rate of the target data flow by a third percentage.

Figure 7:
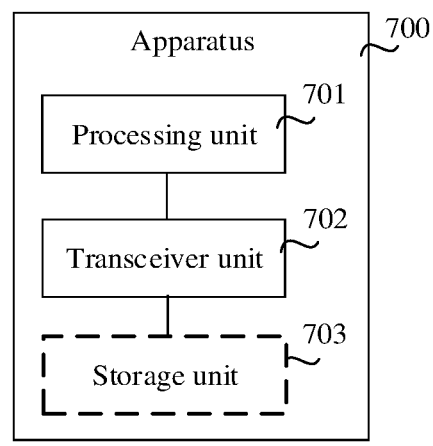
FIG. 7 is a schematic diagram of a structure of an apparatus.

Based on the foregoing content and a same concept, an apparatus 700 may be configured to perform the solution in FIG. 2 or the solution in FIG. 5A and FIG. 5B. FIG. 7 shows an example of a schematic diagram of a structure of an apparatus 700 that includes a processing unit 701 and a transceiver unit 702. Optionally, the apparatus 700 further includes a storage unit 703. The processing unit 701 is configured to: determine a feedback trigger condition, meta information, and a data flow identifier of a data flow; obtain a packet header of a to-be-transmitted data packet; determine, based on the data flow identifier and the obtained packet header, first data packets corresponding to a same egress port from the to-be-transmitted data packet; obtain, based on the meta information, a meta information value corresponding to the first data packet; and when determining that the feedback trigger condition is met, encapsulate the meta information value corresponding to the first data packet and a packet header of the first data packet into a second data packet, and send the second data packet to a second node by using the transceiver unit 702, where the second data packet is used to enable the second node to reduce a transmission rate of at least one data flow in data flows corresponding to the first data packet, or send indication information to a third node, where the indication information is used to indicate the third node to reduce a transmission rate of at least one data flow in data flows corresponding to the first data packet.

For related content of the foregoing optional implementations in this embodiment, refer to the foregoing embodiments. Details are not described herein again.

It should be understood that division into units of the foregoing apparatus is merely logical function division, and during actual implementation, all or some of the units may be integrated into a physical entity, or the units may be physically separated. In this embodiment, the processing unit 701 in FIG. 7 may be implemented by the processor 601 in FIG. 6. The transceiver unit 702 in FIG. 7 may be implemented by the communications interface 602 in FIG. 6. The processing unit 701 may perform the solution performed by the processor 601 in FIG. 6, and the transceiver unit 702 may perform the solution performed by the communications interface 602 in FIG. 6. For other content, refer to the foregoing content. Details are not described herein again.

The foregoing embodiments may be all or partially implemented by using software, hardware, firmware, or any combination thereof. When a software program is used for implementation, the embodiments may be all or partially implemented in a form of a computer program product. The computer program product includes one or more instructions. When the computer program instructions are loaded and executed on a computer, the procedures or the functions according to embodiments are all or partially generated. The computer may be a general-purpose computer, a dedicated computer, a computer network, or another programmable apparatus. The instructions may be stored in a computer storage medium or may be transmitted from a computer storage medium to another computer storage medium. For example, the instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer storage medium may be any usable medium accessible to a computer, or a data storage device, such as a server or a data center, integrating one or more usable media. The usable medium may be a magnetic medium (for example, a floppy disk, a hard disk drive, a magnetic tape, a magneto-optical disc (MO)), an optical medium (for example, a CD, a DVD, a BD, an HVD), a semiconductor medium (for example, a ROM, an EPROM, an EEPROM, a non-volatile memory (NAND FLASH), a solid-state drive (SSD)), or the like.

A person skilled in the art should understand that embodiments may be provided as a method, a system, or a computer program product. Therefore, embodiments may use a form of hardware only embodiments, software only embodiments, or embodiments with a combination of software and hardware. Moreover, embodiments o may use a form of a computer program product that is implemented on one or more computer-usable storage media (including but not limited to a disk memory, a CD-ROM, an optical memory, and the like) that include computer-usable program code.

Embodiments are described with reference to the flowcharts and/or block diagrams of the method, the device (system), and the computer program product according to embodiments. It should be understood that instructions may be used to implement each process and/or each block in the flowcharts and/or the block diagrams and a combination of a process and/or a block in the flowcharts and/or the block diagrams. These instructions may be provided for a general-purpose computer, a dedicated computer, an embedded processor, or a processor of another programmable data processing device to generate a machine, so that the instructions executed by a computer or a processor of another programmable data processing device generate an apparatus for implementing a function in one or more processes in the flowcharts and/or in one or more blocks in the block diagrams.

These computer program instructions may be stored in a computer-readable memory that can instruct the computer or another programmable data processing device to work in a specific manner, so that the instructions stored in the computer-readable memory generate an artifact that includes an instruction apparatus. The instruction apparatus implements a function in one or more processes in the flowcharts and/or in one or more blocks in the block diagrams.

These instructions may be loaded onto a computer or another programmable data processing device, so that a series of operations and steps are performed on the computer or another programmable device, to generate computer-implemented processing. Therefore, the instructions executed on the computer or another programmable device provide steps for implementing a specified function in one or more processes in the flowcharts and/or in one or more blocks in the block diagrams.

It is clear that a person skilled in the art can make various modifications and variations to embodiments without departing from the spirit and scope of the embodiments.

What is claimed is:

1. A data transmission control apparatus, comprising a communications interface and a processor, wherein the processor performs steps comprising:
   determine a feedback trigger condition, meta information, and a data flow identifier of a data flow, wherein the data flow communicates with one or more sensors;
   obtain a packet header of a to-be-transmitted data packet;
   determine, based on the data flow identifier and the obtained packet header, a first data packet corresponding to an egress port matching a data flow from the to-be-transmitted data packet;
   obtain, based on the meta information, a meta information value corresponding to the first data packet; and
   when determining that the feedback trigger condition is met, encapsulate the meta information value corresponding to the first data packet and a packet header of the first data packet into a second data packet, and send the second data packet to a second node through the communications interface, wherein the second data packet is used to enable the second node to reduce a transmission rate of at least one data flow in data flows corresponding to the first data packet, or send indication information to a third node through the communications interface, wherein the indication information is used to indicate the third node to reduce a transmission rate of at least one data flow in data flows corresponding to the first data packet;
   wherein the meta information comprises at least one of a node identifier, an ingress port identifier, an egress port identifier, a queue identifier, a forwarding latency of a data packet, a maximum tolerable latency of a single packet, a data flow identifier corresponding to the data packet, or a data type corresponding to the data packet, and the data type comprises control plane data, management plane data, and data plane data; and
   wherein the feedback trigger condition comprises any one or more of the following:
      a forwarding latency of the first data packet is greater than the maximum tolerable latency of the single packet;
      a quantity of received first data packets is greater than a preset quantity;
      a queue depth is greater than a preset queue depth, wherein the queue depth is a ratio of a buffer occupied by all data packets in a queue to a total buffer for the queue; and
      utilization of egress bandwidth for the queue is greater than reset bandwidth utilization.

2. The data transmission control apparatus according to claim 1, wherein the processor further performs steps comprising:
   add the meta information value corresponding to the first data packet before the packet header of the first data packet; and
   add a new packet header before the meta information value corresponding to the first data packet, to obtain the second data packet, wherein a destination address in the new packet header is an address of the second node.

3. The data transmission control apparatus according to claim 1, wherein the processor further performs steps comprising:
   modify a priority of the second data packet to be greater than a priority threshold.

4. The data transmission control apparatus according to claim 1, wherein the meta information further comprises the queue depth and/or the utilization of the egress bandwidth for the queue; and
   the processor further performs steps comprising:
      determine, based on the meta information value corresponding to the first data packet, that the feedback trigger condition is met.

5. The data transmission control apparatus according to claim 1, wherein the to-be-transmitted data packet are from the third node and/or the second node.

6. The data transmission control apparatus according to claim 1, wherein the communications interface further performs steps comprising:
receive the feedback trigger condition, the meta information, and the data flow identifier that are configured by the second node.

7. A data transmission control apparatus, comprising a processor and a communications interface, wherein:
the communications interface is configured to:
receive M second data packets from a first node, wherein M is an integer greater than or equal to 1, the second data packet is sent by the first node to a second node when the first node determines that a feedback trigger condition is met, the second data packet carries a packet header of a first data packet and a meta information value corresponding to the first data packet, and the first data packet is determined by the first node from a to-be-transmitted data packet based on a data flow identifier of a data flow, wherein the data flow communicates with one or more sensors; and
the processor is configured to:
determine a target data flow based on the M second data packets and a rate reduction condition, wherein the target data flow is at least one of the one or more data flows corresponding to the M second data packets, wherein M is an integer greater than or equal to 1;
the communications interface is further configured to:
reduce a transmission rate of the target data flow in a rate reduction manner; or
send indication information to a third node through the communications interface, wherein the indication information is used to indicate the third node to reduce the transmission rate of the target data flow in the rate reduction manner;
the communications interface is further configured to:
send, to the first node, the feedback trigger condition, meta information, and the data flow identifier that are configured; and
the meta information further comprises a queue depth and a queue occupancy depth that is of a data flow and that corresponds to the first data packet; and
the rate reduction condition comprises any of a first condition, a second condition, and a third condition, wherein:
the first condition is that in a sampling period, an average value of forwarding latencies in meta information values respectively corresponding to k first data packets belonging to a same data flow is greater than a first preset value, wherein k is an integer less than or equal to M, wherein k is an integer less than or equal to M;
the second condition is that in the sampling period, an average value of queue occupancy depths that are of data flows and that are in the meta information values respectively corresponding to the k first data packets belonging to the same data flow is greater than a second preset value; and
the third condition is that in the sampling period, an average value of queue depths in the meta information values respectively corresponding to the k first data packets belonging to the same data flow is greater than a third preset value.

8. The data transmission control apparatus according to claim 7, wherein the meta information comprises at least one of a node identifier, an ingress port identifier, an egress port identifier, a queue identifier, a forwarding latency of a data packet, a maximum tolerable latency of a single packet, a data flow identifier corresponding to the data packet, or a data type corresponding to the data packet, and the data type comprises control plane data, management plane data, and data plane data.

9. The data transmission control apparatus according to claim 7, wherein the M second data packets correspond to one data flow; and
the processor is further configured to:
after determining that an average value of forwarding latencies in meta information values that correspond to first data packets and that are respectively carried in k second data packets in the M second data packets is greater than the first preset value, determine the data flow corresponding to the M second data packets as the target data flow; or
after determining that an average value of queue occupancy depths that are of data flows and that are in meta information values that correspond to first data packets and that are respectively carried in k second data packets in the M second data packets is greater than the second preset value, determine the data flow corresponding to the M second data packets as the target data flow; or
after determining that an average value of queue depths in meta information values that correspond to first data packets and that are respectively carried in k second data packets in the M second data packets is greater than the third preset value, determine the data flow corresponding to the M second data packets as the target data flow.

10. The data transmission control apparatus according to claim 7, wherein k is an integer less than M, the M second data packets correspond to a plurality of data flows, and each data flow comprises k second data packets; and
the processor is further configured to:
determine an average value of forwarding latencies in meta information values that correspond to first data packets and that are respectively carried in the k second data packets in each data flow, and determining a data flow in which the average value of the forwarding latencies is greater than the first preset value and whose priority is the lowest as the target data flow; or
determine an average value of queue occupancy depths that are of data flows and that are in meta information values that correspond to first data packets and that are respectively carried in the k second data packets in each data flow, and determining a data flow in which the average value of the queue occupancy depths of the data flows is greater than the second preset value and whose priority is the lowest as the target data flow; or
determine an average value of queue depths in meta information values that correspond to first data packets and that are respectively carried in the k second data packets in each data flow, and determining a data flow in which the average value of the queue depths is greater than the third preset value and whose priority is the lowest as the target data flow.

11. The data transmission control apparatus according to claim 7, wherein the rate reduction manner comprises any of the following:

after the target data flow is determined based on the first condition, reducing the transmission rate of the target data flow by a first percentage;

after the target data flow is determined based on the second condition, reducing the transmission rate of the target data flow by a second percentage; or after the target data flow is determined based on the third condition, reducing the transmission rate of the target data flow by a third percentage.

12. A non-transitory computer-readable storage medium, comprising a program, wherein when being executed by a processor, the processor is configured to:

determining a feedback trigger condition, meta information, and a data flow identifier of a data flow, wherein the data flow communicates with one or more sensors;

obtaining a packet header of a to-be-transmitted data packet;

determining, based on the data flow identifier and the obtained packet header, a first data packet corresponding to an egress port same as the data flow from the to-be-transmitted data packet;

obtaining, based on the meta information, a meta information value corresponding to the first data packet; and when determining that the feedback trigger condition is met, encapsulating the meta information value corresponding to the first data packet and a packet header of the first data packet into a second data packet, and sending the second data packet to a second node through the communications interface, wherein the second data packet is used to enable the second node to reduce a transmission rate of at least one data flow in data flows corresponding to the first data packet, or sending indication information to a third node through the communications interface, wherein the indication information is used to indicate the third node to reduce a transmission rate of at least one data flow in data flows corresponding to the first data packet;

wherein the meta information comprises at least one of a node identifier, an ingress port identifier, an egress port identifier, a queue identifier, a forwarding latency of a data packet, a maximum tolerable latency of a single packet, a data flow identifier corresponding to the data packet, and a data type corresponding to the data packet, and the data type comprises control plane data, management plane data, and data plane data; and wherein the feedback trigger condition comprises any one or more of:

a forwarding latency of the first data packet is greater than the maximum tolerable latency of the single packet;

a quantity of received first data packets is greater than a preset quantity;

a queue depth is greater than a preset queue depth, wherein the queue depth is a ratio of a buffer occupied by all data packets in a queue to a total buffer for the queue; and utilization of egress bandwidth for the queue is greater than preset bandwidth utilization.

13. The non-transitory computer-readable storage medium according to claim 12, wherein when the program is executed by the processor, the following steps are further performed:

adding the meta information value corresponding to the first data packet before the packet header of the first data packet; and adding a new packet header before the meta information value corresponding to the first data packet, to obtain the second data packet, wherein a destination address in the new packet header is an address of the second node.

14. The non-transitory computer-readable storage medium according to claim 12, wherein when the program is executed by the processor, the following steps are further performed:

modifying a priority of the second data packet to be greater than a priority threshold.

* * * * *

UNITED STATES PATENT AND TRADEMARK OFFICE
CERTIFICATE OF CORRECTION

| | | |
|---|---|---|
| PATENT NO. | : 12,341,693 B2 | Page 1 of 1 |
| APPLICATION NO. | : 17/686581 | |
| DATED | : June 24, 2025 | |
| INVENTOR(S) | : Zhe Wang | |

It is certified that error appears in the above-identified patent and that said Letters Patent is hereby corrected as shown below:

In the Claims

Claim 1: Column 30, Line 44: "than reset bandwidth utilization." should read as -- than preset bandwidth utilization. --.

Claim 7: Column 31, Line 47: "the rate reduction condition comprises any of a first" should read as -- the rate reduction condition comprises any one of a first --.

Signed and Sealed this
Eleventh Day of November, 2025

John A. Squires
*Director of the United States Patent and Trademark Office*